United States Patent
Hosseini et al.

(10) Patent No.: US 11,871,454 B2
(45) Date of Patent: Jan. 9, 2024

(54) HANDLING COLLISIONS BETWEEN ACCESS LINK AND SIDELINK

(71) Applicant: QUALCOMM Incorporated, San Diego, CA (US)

(72) Inventors: Seyedkianoush Hosseini, San Diego, CA (US); Gokul Sridharan, Sunnyvale, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 16/947,073

(22) Filed: Jul. 16, 2020

(65) Prior Publication Data
US 2021/0022184 A1 Jan. 21, 2021

Related U.S. Application Data

(60) Provisional application No. 62/876,444, filed on Jul. 19, 2019.

(51) Int. Cl.
*H04W 72/04* (2023.01)
*H04W 74/08* (2009.01)
(Continued)

(52) U.S. Cl.
CPC ... *H04W 74/0825* (2013.01); *H04W 72/0446* (2013.01); *H04W 72/0473* (2013.01);
(Continued)

(58) Field of Classification Search
None
See application file for complete search history.

(56) References Cited

U.S. PATENT DOCUMENTS

| 2017/0367087 A1 | 12/2017 | Seo |
| 2018/0199251 A1 | 7/2018 | Kim et al. |

(Continued)

FOREIGN PATENT DOCUMENTS

| EP | 3291626 A1 | 3/2018 |
| EP | 3291626 A1 | 3/2018 |
| WO | 2021002685 A1 | 1/2021 |

OTHER PUBLICATIONS

Huawei., et al., "Sidelink Physical Layer Procedures for NR V2X," 3GPP Draft, 3GPP TSG RAN WG1 Meeting #97, R1-1906008, 3rd Generation Partnership Project (3GPP), Mobile Competence Centre, 650, Route Des Lucioles, F-06921, Sophia-Antipolis Cedex, France, vol. RAN WG1. No, Reno, USA; May 13, 2019-May 17, 2019, May 3, 2019 (May 13, 2019), XP051708050, 23 pages, Retrieved from the Internet: URL: http://www.3gpp.org/ftp/tsg%5Fran/WG1%5FRL1/TSGR1%5F97/Docs/R1%2D1906008%2Ezip , [retrieved on May 3, 2019], pp. 6-8, 2.4.1.1 HARQ feedback.

(Continued)

*Primary Examiner* — Kodzovi Acolatse
(74) *Attorney, Agent, or Firm* — Harrity & Harrity, LLP

(57) ABSTRACT

Various aspects of the present disclosure generally relate to wireless communication. In some aspects, a user equipment (UE) may detect a collision between an access link communication and a sidelink communication. The UE may resolve the conflict based at least in part on a priority associated with the access link communication and a priority associated with the sidelink communication. Numerous other aspects are provided.

76 Claims, 13 Drawing Sheets

(51) Int. Cl.
    *H04W 72/0446* (2023.01)
    *H04W 72/044* (2023.01)
    *H04W 72/1268* (2023.01)
    *H04W 72/30* (2023.01)
    *H04W 72/56* (2023.01)
    *H04W 92/18* (2009.01)

(52) U.S. Cl.
    CPC ....... *H04W 72/1268* (2013.01); *H04W 72/30* (2023.01); *H04W 72/56* (2023.01); *H04W 92/18* (2013.01)

(56) References Cited

U.S. PATENT DOCUMENTS

| | | | | |
|---|---|---|---|---|
| 2019/0159224 | A1* | 5/2019 | Yasukawa | H04W 72/04 |
| 2020/0045724 | A1* | 2/2020 | Lu | H04W 72/1242 |
| 2020/0305165 | A1* | 9/2020 | Inokuchi | H04W 72/0486 |
| 2020/0314915 | A1* | 10/2020 | Lin | H04W 74/0833 |
| 2020/0396701 | A1* | 12/2020 | Yi | H04W 52/367 |
| 2021/0153065 | A1* | 5/2021 | Adjakple | H04W 76/14 |
| 2021/0185559 | A1* | 6/2021 | Lee | H04L 47/2458 |
| 2021/0204301 | A1* | 7/2021 | Lee | H04W 28/06 |
| 2021/0211239 | A1* | 7/2021 | Fan | H04L 49/3072 |
| 2021/0250934 | A1* | 8/2021 | Zhao | H04W 52/383 |
| 2021/0329657 | A1* | 10/2021 | Tang | H04W 4/40 |
| 2021/0377963 | A1* | 12/2021 | Wang | H04W 72/0453 |
| 2022/0095279 | A1* | 3/2022 | Hwang | H04W 72/20 |
| 2022/0255680 | A1* | 8/2022 | Moon | H04L 1/1854 |

OTHER PUBLICATIONS

OPPO: "Left Issues on MAC for NR-V2X", 3GPP Draft, 3GPP TSG-RAN WG2 Meeting #106, R2-1905568—Left Issues on MAC for NR-V2X, 3rd Generation Partnership Project (3GPP), Mobile Competence Centre, 650, Route Des Lucioles, F-06921, Sophia-Antipolis Cedex, France, vol. RAN WG2. No. Reno. US, May 13, 2019- May 17, 2019, May 13, 2019 (May 13, 2019), XP051729072, pp. 1-6, Retrieved from the Internet: URL: http://www.3gpp.org/ftp/Meetings%5F3GPP%5FSYNC/RAN2/Docs/R2%2D1905568%2Ezip [retrieved on May 13, 2019] section 1; p. 1 section 2.2.

Huawei., et al., "Sidelink Physical Layer Procedures for NR V2X," 3GPP Draft, 3GPP TSG RAN WG1 Meeting #97, R1-1906008, 3rd Generation Partnership Project (3GPP), Mobile Competence Centre, 650, Route Des Lucioles, F-06921, Sophia-Antipolis Cedex, France, vol. RAN WG1. No, Reno, USA; May 13, 2019-May 17, 2019, May 3, 2019 (May 3, 2019), XP051708050, 23 pages, Retrieved from the Internet: URL: http://www.3gpp.org/ftp/tsg%5Fran/WG1%5FRL1/TSGR1%5F97/Docs/R1%2D1906008%2Ezip, [retrieved on May 3, 2019], pp. 6-8, 2.4.1.1 HARQ feedback, decision, making.

Huawei., et al., "QoS Management for NR Sidelink", 3GPP Draft, 3GPP TSG RAN WG1 Meeting #96bis, R1-1903952, 3RD Generation Partnership Project (3GPP), Mobile Competence Centre, 650, Route Des Lucioles, F-06921, Sophia-Antipolis Cedex, France, vol. RAN WG1. No. Xi 'an, China, Apr. 8, 2019-Apr. 12, 2019, Apr. 2, 2019 (Apr. 2, 2019), XP051707067, 4 pages, Retrieved from the Internet: URL: http://www.3gpp.org/ftp/tsg%5Fran/WG1%5FRL1/TSGR1%5F96b/Docs/R1%2D1903952%2Ezip [retrieved on Apr. 2, 2019] section 2.4; pp. 2-3.

International Search Report and Written Opinion—PCT/US2020/070295—ISA/EPO—dated Sep. 15, 2020.

ITRI: "Issues in NR Uu for Mode 3 NR Sidelink Resource Access," 3GPP Draft, 3GPP TSG-RAN WG1 Meeting #94, R1-1808727, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 10, 2018 (Aug. 10, 2018), XP051516101, pp. 1-6, Retrieved from the Internet: URL: http://www.3gpp.org/ftp/tsg%5Fran/WG1%5FRL1/Docs/R1%2D1808727%2Ezip [retrieved on Aug. 10, 2018] section 3.2; pp. 3-4.

OPPO: "Left Issues on MAC for NR-V2X", 3GPP Draft, 3GPP TSG-RAN WG2 Meeting #106, R2-1905568—Left Issues on MAC for NR-V2X, 3rd Generation Partnership Project (3GPP), Mobile Competence Centre, 650, Route Des Lucioles, F-06921, Sophia-Antipolis Cedex, France, vol. RAN WG2. No. Reno. US, May 13, 2019-May 17, 2019, May 13, 2019 (May 13, 2019), XP051729072, pp. 1-6, Retrieved from the Internet: URL: http://www.3gpp.org/ftp/Meetings%5F3GPP%5FSYNC/RAN2/Docs/R2%2D1905568%2Ezip [retrieved on May 13, 2019] section 1; p. 1 section 2.2; pp. 3-4.

SAMSUNG: "Further Considerations on Uu/PC5 Prioritization," 3GPP Draft, 3GPP TSG-RAN WG2 Meeting #97, R2-1701280, Further Considerations on Uu PC5 Prioritization, 3rd Generation Partnership Project (3GPP), Mobile Competence Centre, 650, Route Des Lucioles, F-06921, Sophia-Antipolis Cedex, France, vol. RAN WG2. No. Athens, Greece, Feb. 13, 2017-Feb. 17, 2017, Feb. 12, 2017 (Feb. 12, 2017), XP051211946, 3 pages, Retrieved from the Internet: URL: http://www.3gpp.org/ftp/Meetings_3GPP_SYNC/RAN2/Docs/ [retrieved on Feb. 12, 2017] the whole document.

\* cited by examiner

HANDLING COLLISIONS BETWEEN ACCESS LINK AND SIDELINK

CROSS-REFERENCE TO RELATED APPLICATION

This patent Applications claims priority to U.S. Provisional Patent Application No. 62/876,444, filed on Jul. 19, 2019, entitled "HANDLING COLLISIONS BETWEEN ACCESS LINK AND SIDELINK," and assigned to the assignee hereof. The disclosure of the prior Applications is considered part of and is incorporated by reference into this patent Applications.

FIELD OF THE DISCLOSURE

Aspects of the present disclosure generally relate to wireless communication and to techniques and apparatuses for handling collisions between access link and sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include detecting a collision between transmission of an uplink communication associated with the UE and transmission of a sidelink communication associated with the UE; and transmitting, based at least in part on detecting the collision, at least one of the uplink communication or the sidelink communication based at least in part on a priority associated with the uplink communication and a priority associated with the sidelink communication.

In some aspects, a method of wireless communication, performed by a UE, may include detecting a collision between transmission of an uplink communication associated with the UE and reception of a sidelink communication associated with the UE; and transmitting the uplink communication or receiving the sidelink communication based at least in part on detecting the collision and based at least in part on a priority associated with the uplink communication and a priority associated with the sidelink communication.

In some aspects, a method of wireless communication, performed by a UE, may include detecting a collision between reception of a downlink communication associated with the UE and transmission of a sidelink communication associated with the UE; and receiving the downlink communication or transmitting the sidelink communication based at least in part on detecting the collision and based at least in part on a priority associated with the downlink communication and a priority associated with the sidelink communication.

In some aspects, a method of wireless communication, performed by a UE, may include detecting a collision between reception of a downlink communication associated with the UE and reception of a sidelink communication associated with the UE; and receiving, based at least in part on detecting the collision, the downlink communication or the sidelink communication based at least in part on a priority associated with the downlink communication and a priority associated with the sidelink communication.

In some aspects, a UE for wireless communication may include memory and one or more processors operatively coupled to the memory. The memory and the one or more processors may be configured to detect a collision between transmission of an uplink communication associated with the UE and transmission of a sidelink communication associated with the UE; and transmit, based at least in part on detecting the collision, at least one of the uplink communication or the sidelink communication based at least in part on a priority associated with the uplink communication and a priority associated with the sidelink communication.

In some aspects, a UE for wireless communication may include memory and one or more processors operatively coupled to the memory. The memory and the one or more processors may be configured to detect a collision between reception of a downlink communication associated with the UE and reception of a sidelink communication associated with the UE; and receive, based at least in part on detecting the collision, the downlink communication or the sidelink communication based at least in part on a priority associated with the downlink communication and a priority associated with the sidelink communication.

In some aspects, a UE for wireless communication may include memory and one or more processors operatively coupled to the memory. The memory and the one or more processors may be configured to detect a collision between transmission of an uplink communication associated with the UE and reception of a sidelink communication associated with the UE; and transmit the uplink communication or receive the sidelink communication based at least in part on detecting the collision and based at least in part on a priority associated with the uplink communication and a priority associated with the sidelink communication.

In some aspects, a UE for wireless communication may include memory and one or more processors operatively coupled to the memory. The memory and the one or more processors may be configured to detect a collision between reception of a downlink communication associated with the UE and transmission of a sidelink communication associated with the UE; and receive the downlink communication or transmit the sidelink communication based at least in part on detecting the collision and based at least in part on a priority associated with the downlink communication and a priority associated with the sidelink communication.

In some aspects, a non-transitory computer-readable medium may store one or more instructions for wireless communication. The one or more instructions, when executed by one or more processors of a UE, may cause the one or more processors to detect a collision between transmission of an uplink communication associated with the UE and transmission of a sidelink communication associated with the UE; and transmit, based at least in part on detecting the collision, at least one of the uplink communication or the sidelink communication based at least in part on a priority associated with the uplink communication and a priority associated with the sidelink communication.

In some aspects, a non-transitory computer-readable medium may store one or more instructions for wireless communication. The one or more instructions, when executed by one or more processors of a UE, may cause the one or more processors to detect a collision between reception of a downlink communication associated with the UE and reception of a sidelink communication associated with the UE; and receive, based at least in part on detecting the collision, the downlink communication or the sidelink communication based at least in part on a priority associated with the downlink communication and a priority associated with the sidelink communication.

In some aspects, a non-transitory computer-readable medium may store one or more instructions for wireless communication. The one or more instructions, when executed by one or more processors of a UE, may cause the one or more processors to detect a collision between transmission of an uplink communication associated with the UE and reception of a sidelink communication associated with the UE; and transmit the uplink communication or receive the sidelink communication based at least in part on detecting the collision and based at least in part on a priority associated with the uplink communication and a priority associated with the sidelink communication.

In some aspects, a non-transitory computer-readable medium may store one or more instructions for wireless communication. The one or more instructions, when executed by one or more processors of a UE, may cause the one or more processors to detect a collision between reception of a downlink communication associated with the UE and transmission of a sidelink communication associated with the UE; and receive the downlink communication or transmit the sidelink communication based at least in part on detecting the collision and based at least in part on a priority associated with the downlink communication and a priority associated with the sidelink communication.

In some aspects, an apparatus for wireless communication may include means for detecting a collision between reception of a downlink communication associated with the apparatus and transmission of a sidelink communication associated with the apparatus; and means for receiving the downlink communication or transmitting the sidelink communication based at least in part on detecting the collision and based at least in part on a priority associated with the downlink communication and a priority associated with the sidelink communication.

In some aspects, an apparatus for wireless communication may include means for detecting a collision between transmission of an uplink communication associated with the apparatus and transmission of a sidelink communication associated with the apparatus; and means for transmitting, based at least in part on detecting the collision, at least one of the uplink communication or the sidelink communication based at least in part on a priority associated with the uplink communication and a priority associated with the sidelink communication.

In some aspects, an apparatus for wireless communication may include means for detecting a collision between reception of a downlink communication associated with the apparatus and reception of a sidelink communication associated with the apparatus; and means for receiving, based at least in part on detecting the collision, the downlink communication or the sidelink communication based at least in part on a priority associated with the downlink communication and a priority associated with the sidelink communication.

In some aspects, an apparatus for wireless communication may include means for detecting a collision between transmission of an uplink communication associated with the apparatus and reception of a sidelink communication associated with the apparatus; and means for transmitting the uplink communication or receiving the sidelink communication based at least in part on detecting the collision and based at least in part on a priority associated with the uplink communication and a priority associated with the sidelink communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
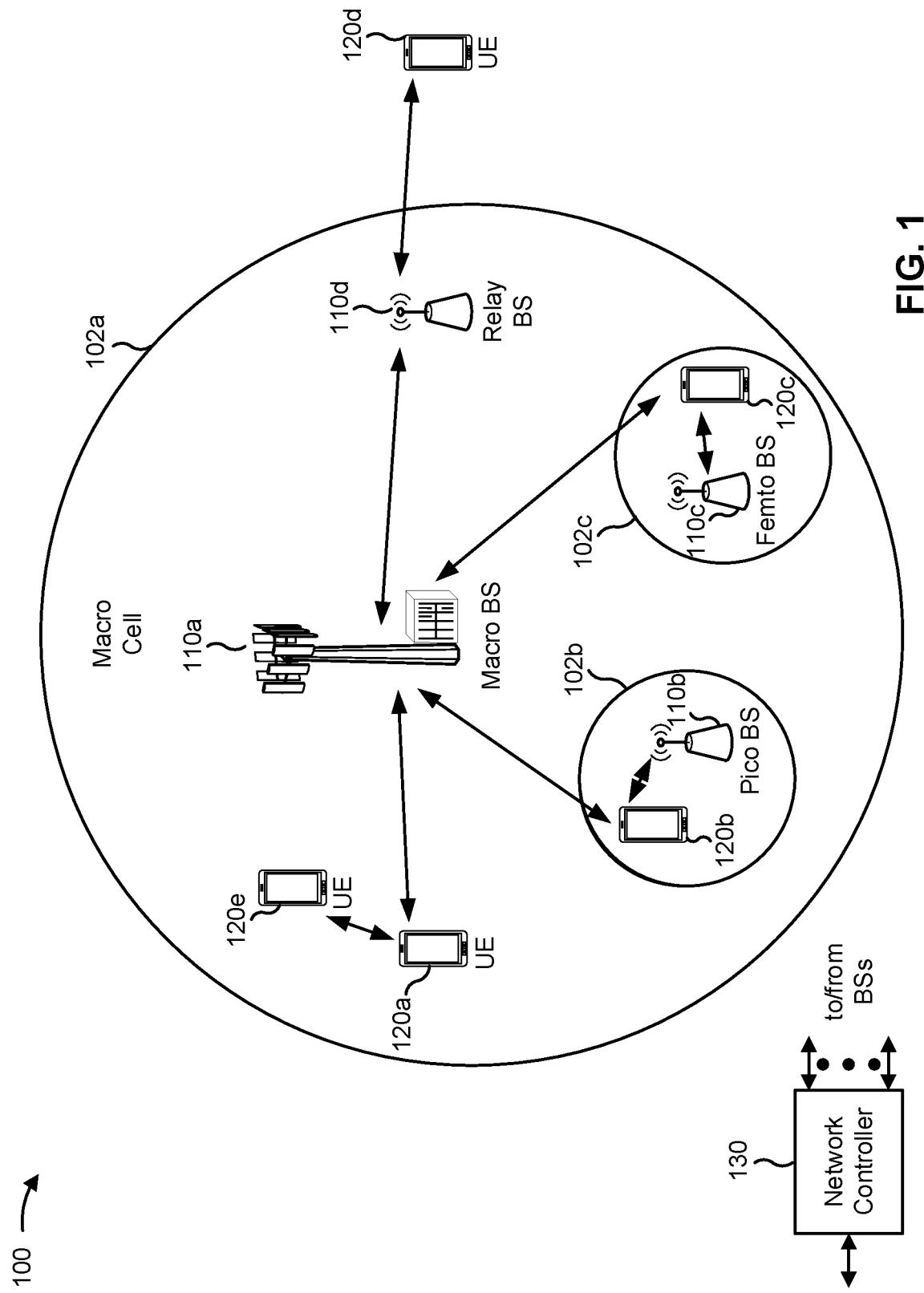
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more subordinate entities, such as two or more UEs 120 (e.g., shown as UE 120a and UE 120e), two or more integrated access and backhaul (IAB) nodes, and/or other types of wireless communication devices may communicate directly using one or more sidelink channels (e.g., without using a base station 110 as an intermediary to communicate with one another). For example, the two or more subordinate entities may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the two or more subordinate entities may perform scheduling operations, resource selection operations, and/or other operations described elsewhere herein as being performed by the base station 110. The two or more subordinate entities may communicate over a sidelink channel using wireless sidelink communications. "Sidelink communication" may refer to a communication that is transmitted from one subordinate entity to another subordinate entity (e.g., UE-to-UE or IAB node-to-IAB node) without relaying that communication through a scheduling entity (e.g., a BS or an IAB donor), even though the scheduling entity may be utilized for scheduling or control purposes. In some examples, a sidelink communication may be transmitted using a licensed frequency spectrum, an unlicensed frequency spectrum (such as an industrial, scientific and medical (ISM) radio band, (e.g., 5 GHz), that is reserved for purposes other than cellular communication such as Wi-Fi).

As indicated above, FIG. 1 is provided as an example. Other examples may differ from what is described with regard to FIG. 1.

Figure 2:
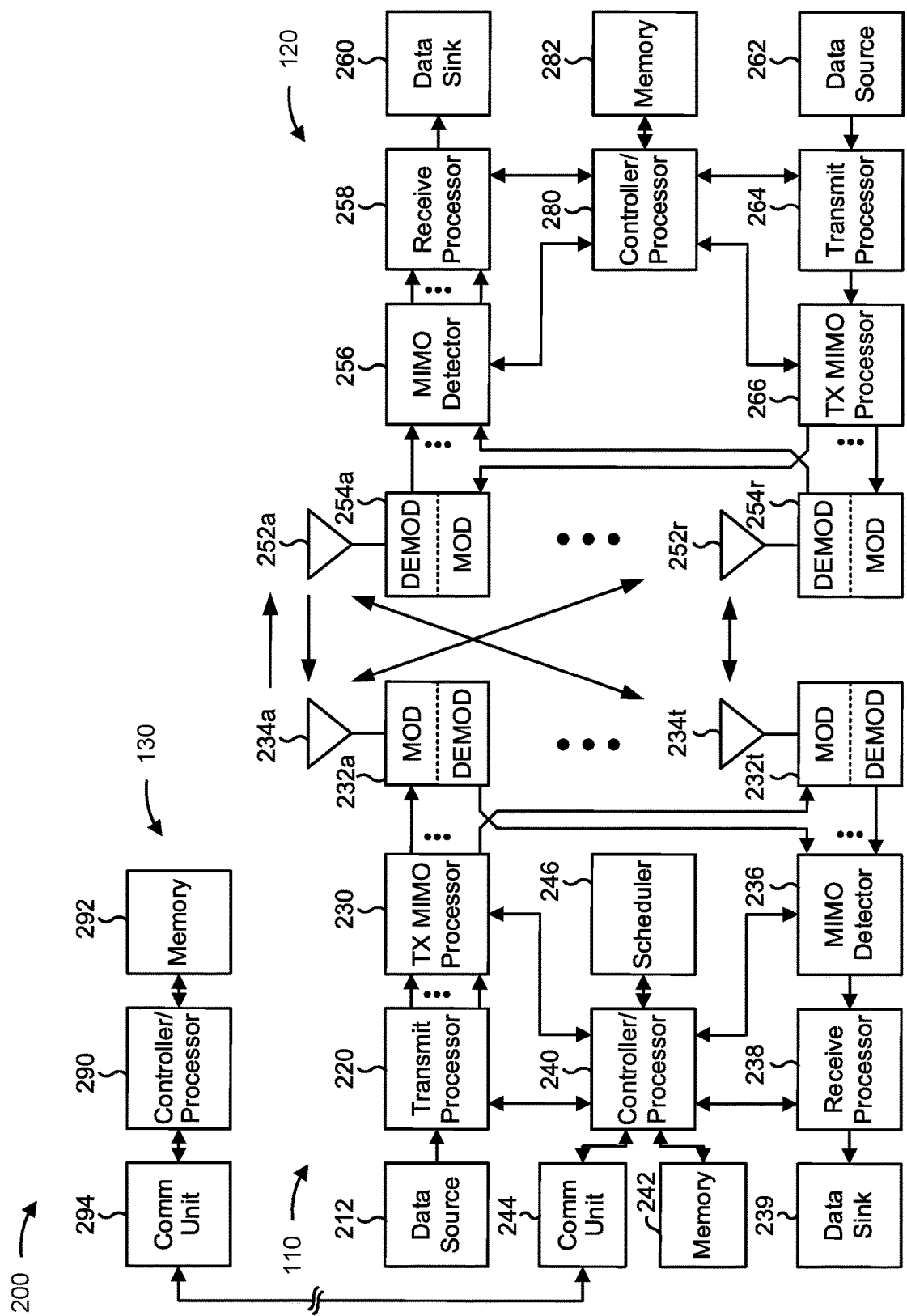
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with handling collisions between access link and sidelink, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, process 1100 of FIG. 11, process 1200 of FIG. 12, and/or other processes as described herein. A scheduler 246 may schedule UEs for data transmission on the downlink and/or uplink.

In some aspects, the UE 120 may include means for detecting a collision between transmission of an uplink communication associated with the UE 120 and transmission of a sidelink communication associated with the UE 120, means for transmitting, based at least in part on detecting the collision, at least one of the uplink communication or the sidelink communication based at least in part on a priority associated with the uplink communication and a priority associated with the sidelink communication, and/or the like. In some aspects, the UE 120 may include means for detecting a collision between reception of a downlink communication associated with the UE 120 and reception of a sidelink communication associated with the UE 120, means for receiving, based at least in part on detecting the collision, the downlink communication or the sidelink communication based at least in part on a priority associated with the downlink communication and a priority associated with the sidelink communication, and/or the like. In some aspects, the UE 120 may include means for detecting a collision between transmission of an uplink communication associated with the UE 120 and reception of a sidelink communication associated with the UE 120, means for transmitting the uplink communication or receiving the sidelink communication based at least in part on detecting the collision and based at least in part on a priority associated with the uplink communication and a priority associated with the sidelink communication, and/or the like. In some aspects, the UE 120 may include means for detecting a collision between reception of a downlink communication associated with the UE 120 and transmission of a sidelink communication associated with the UE 120, means for receiving the downlink communication or transmitting the sidelink communication based at least in part on detecting the collision and based at least in part on a priority associated with the downlink communication and a priority associated with the sidelink communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
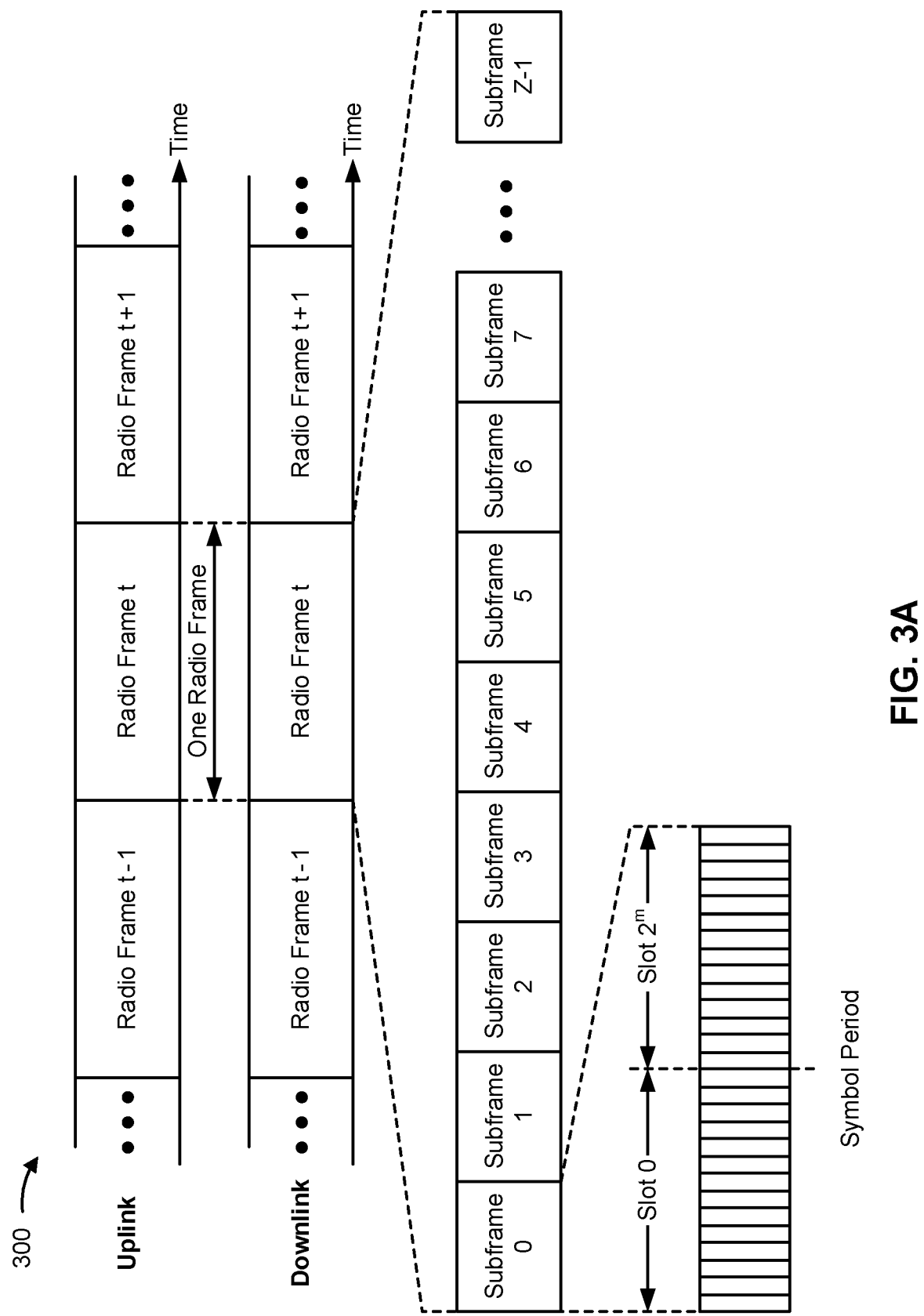
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
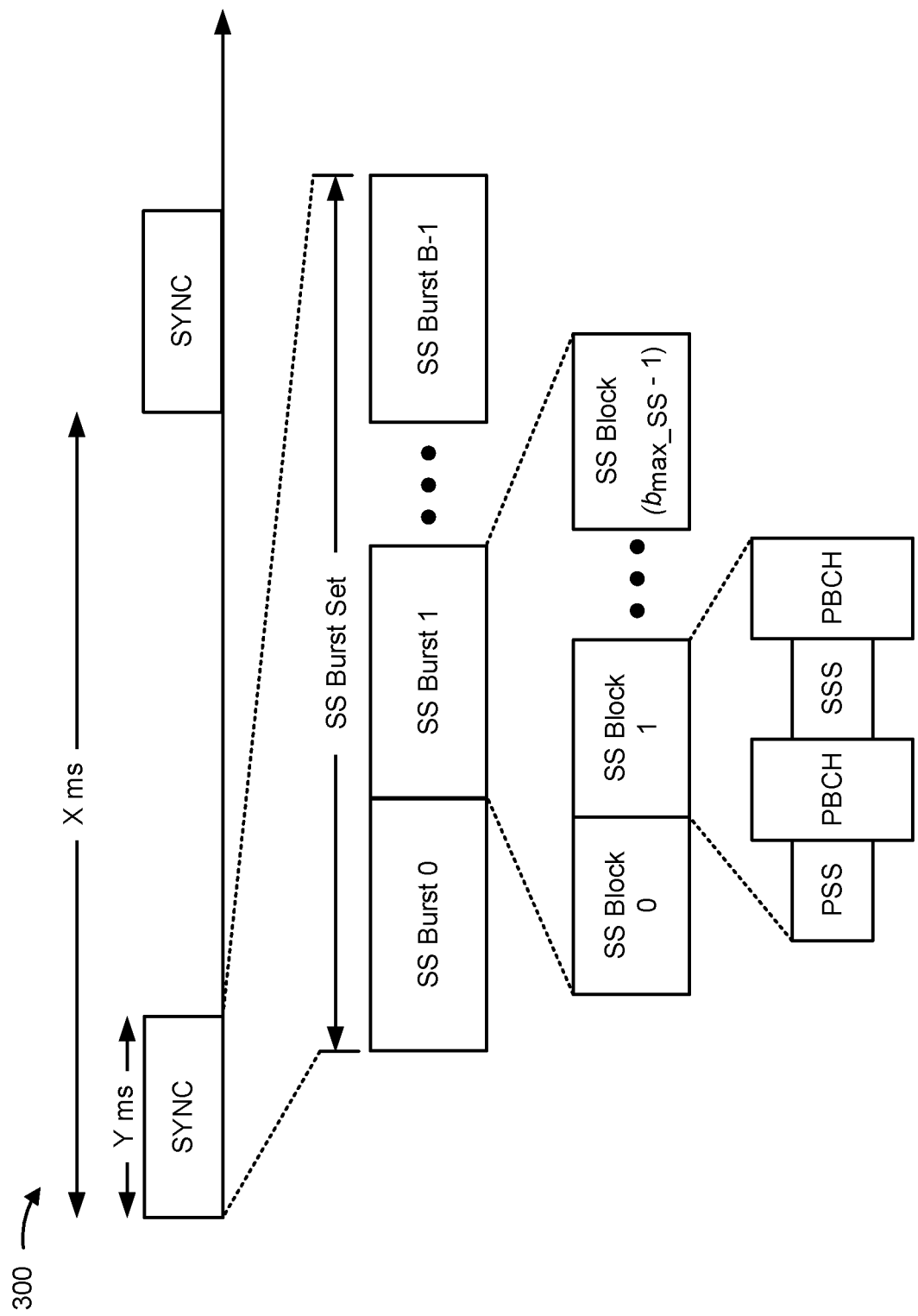
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
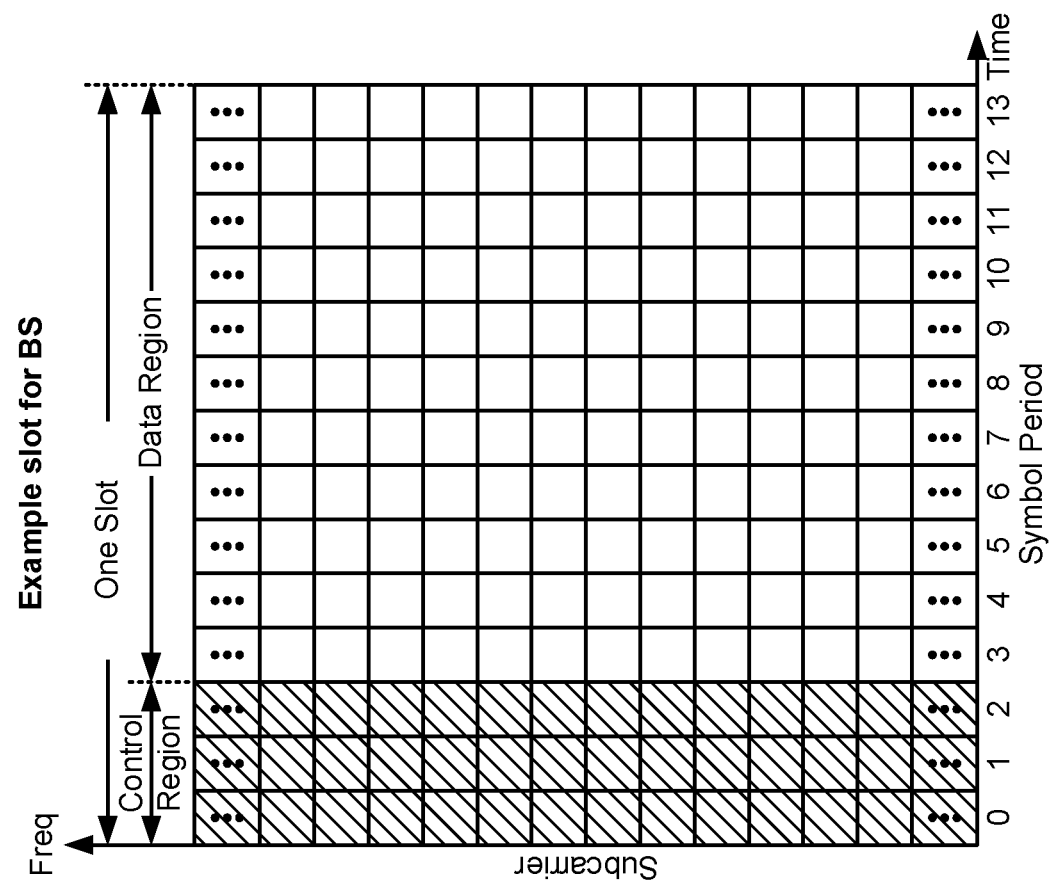
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. "New Radio" (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

As indicated above, a UE (or another subordinate wireless communication device) may communicate with another UE on a wireless sidelink in a wireless network. For example, the UE may transmit one or more sidelink communications to the other UE via the sidelink and/or may receive one or more sidelink communications via the sidelink. Moreover, the UE may communicate with a BS on a wireless access link in the wireless network. For example, the UE may transmit uplink communications to the BS on an uplink of the access link, and/or the UE may receive downlink communications from the BS on a downlink of the access link.

In some cases, a UE may be scheduled to simultaneously perform access link communication and sidelink communication. For example, the scheduled access link communication and the scheduled sidelink communication may at least partially overlap in the time domain. The scheduling of simultaneous access link communication and sidelink communication may be referred to as a collision. In some cases, due to hardware and/or software limitations of the UE, for example, the UE may be unable to perform simultaneous access link communication and sidelink communication (e.g., if the access link communication and the sidelink communication are to occur on the same frequency carrier) and/or may be unable to perform simultaneous access link communication and sidelink communication at full transmit power (e.g., if the access link communication and the sidelink communication are to occur on different frequency carriers).

As a result of a collision between access link communication and sidelink communication, the UE may be unable to determine which of the access link communication or sidelink communication to transmit and/or receive, may be unable to determine a transmit power distribution for the access link communication and the sidelink communication, and/or the like. This, in turn, may result in urgent or time-sensitive communications and/or high priority channels being delayed or dropped by the UE, may result in delayed or dropped hybrid automatic repeat request (HARQ) retransmissions, may result in phase discontinuities between access link communication transmissions and sidelink communication transmissions, and/or the like.

Some aspects described herein provide techniques and apparatuses for handling collisions between access link communications and sidelink communications. In some aspects, a UE may be configured to resolve collisions between access link communications and sidelink communications based at least in part on respective priorities associated with the access link communications and sidelink communications. Moreover, the UE may be configured to resolve collisions between access link communications and sidelink communications based at least in part on other parameters if, for example, the access link communications and the sidelink communications are associated with the same priority. In this way, the UE is capable of resolving collisions by determining whether to drop an access link communication or a sidelink communication (and whether to transmit or receive the access link communication or the sidelink communication), determining respective transmit powers for the access link communication and the sidelink communication, and/or the like, based at least in part on the respective priorities and/or other parameters. This may reduce and/or prevent delayed or dropped urgent or time-sensitive communications and/or high priority channels, may reduce and/or prevent delayed or dropped HARQ retransmissions, may reduce or prevent phase discontinuities between access link communication transmissions and sidelink communication transmissions, and/or the like.

Figure 5:
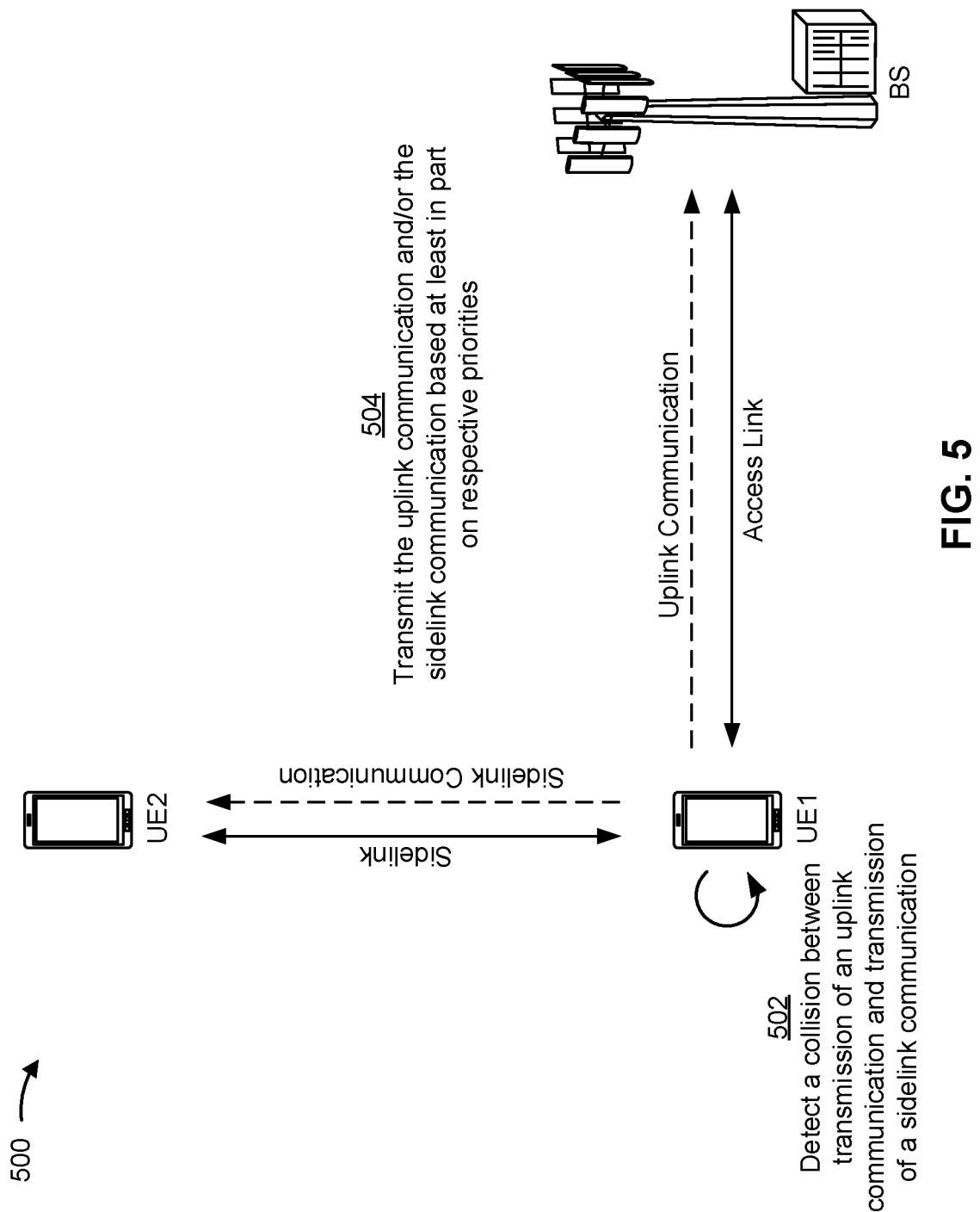
FIGS. 5-8 are diagrams illustrating examples of handling collisions between access link and sidelink, in accordance with various aspects of the present disclosure.

FIG. 5 is a diagram illustrating one or more examples 500 of handling collisions between access link communications and sidelink communications, in accordance with various aspects of the present disclosure. As shown in FIG. 5, examples 500 may include access link communication between a BS (e.g., BS 110) and a UE (e.g., UE 120), and/or sidelink communication between two or more UEs (or other subordinate entities).

In some aspects, the BS and the UEs (e.g., UE1, UE2, and/or the like) may be included in a wireless network, such as wireless network 100 and/or another wireless network. In some aspects, the BS may be a serving BS of UE in the wireless network. The BS and UE1 may communicate via a wireless access link, which may be configured with a frame structure (e.g., frame structure 400 and/or another frame structure), a slot format (e.g., slot format 510 and/or another slot format), and/or the like. The access link may include an uplink and a downlink. In some aspects, UE1 and UE2 may communicate via a wireless sidelink. In some aspects, the sidelink may be configured with a frame structure (e.g., frame structure 400 and/or another frame structure), a slot format (e.g., slot format 510 and/or another slot format), and/or the like.

In some aspects, UE1 may be scheduled by the BS to perform access link communication with the BS. For example, the BS may schedule transmission of downlink communications to UE1 and/or may schedule uplink transmissions from UE1 via the access link. The BS may schedule access link communication by transmitting one or more scheduling communications to UE1. The one or more scheduling communications may periodically and/or semi-statically schedule access link communication for UE1 (e.g., one or more radio resource control (RRC) communications, one or more medium access control (MAC) control element (MAC-CE) communications, and/or the like), may dynamically schedule access link communication for UE1 (e.g., one or more downlink control information (DCI) communications and/or the like), and/or the like.

In some aspects, UE1 may be scheduled by the BS to perform sidelink communication with UE2, similar to access link communication scheduling. In some aspects, the BS may configure a pool of sidelink resources (e.g., time-domain resources, frequency-domain resources, and/or the like), and UE1 and/or UE2 may autonomously schedule the transmission and/or reception of sidelink communications using the pool of sidelink resources.

As shown in FIG. 5, and by reference number 502, UE1 may detect a collision between a scheduled transmission of an uplink communication to the BS and a scheduled transmission of a sidelink communication to UE2. UE1 may detect the collision based at least in part on determining that the transmission of the uplink communication and the transmission of the sidelink communication at least partially overlap in the time domain. For example, the transmission of the uplink communication and the transmission of the sidelink communication may at least partially overlap in one or more symbols, one or more slots, one or more subframes, one or more radio frames, and/or the like.

As further shown in FIG. 5, and by reference number 504, UE1 may, based at least in part on detecting the collision, transmit the uplink communication and/or the sidelink communication based at least in part on respective priorities associated with the uplink communication and/or channel and the sidelink communication and/or channel. In some aspects, UE1 may take into account the respective priorities of the sidelink communication and/or channel and the uplink communication and/or channel based at least in part on UE1 being configured with URLLC (e.g., configured with capability 2 timeline of any cell or if there is a parameter that determines the high priority of channels and that is configured).

In some aspects, UE1 may determine the priority associated with the uplink communication and/or channel based at least in part on the scheduling communication that scheduled the transmission of the uplink communication. For example, the scheduling communication may include one or more bits that indicate the priority of the uplink communication and/or channel. In some aspects, the BS may configure the priority of the uplink communication and/or channel at a physical layer, at a MAC layer (e.g., in which case, the granularity of the priority may be greater than if the priority were generated at the physical layer), or at another communication layer of the BS. If the priority of the uplink communication and/or channel is determined at the physical layer, the priority of the uplink communication and/or channel may be indicated based at least in part on a DCI format/size, a bit field in a DCI, radio network temporary identifier (RNTI), search space index, control resource set (CORESET) index where the DCI is detected, and/or the like. If the priority of the uplink communication and/or channel is MAC-based, then the priority of the uplink communication and/or channel may be indicated as an outcome of a logical channel (LCH) prioritization (e.g., the priority of may be physical uplink shared channel (PUSCH) is dependent on an LCH index from which data is mapped onto the PUSCH.)

In some aspects, UE1 may determine the priority associated with the sidelink communication and/or channel based at least in part on the scheduling communication that scheduled the transmission of the sidelink communication. For example, the scheduling communication may include one or more bits that indicated the priority of the sidelink communication and/or channel. In some aspects, the priority of the sidelink communication and/or channel may include a ProSe per packet priority (PPPP) of the sidelink communication and/or channel, or from an associated sidelink communication in the case that the sidelink communication carries feedback for the associated sidelink communication (e.g., via a physical sidelink feedback channel (PSFCH)).

In some aspects, the priority associated with the uplink communication and/or channel and the priority associated with the sidelink communication and/or channel may have different priority granularities. For example, the priority associated with the uplink communication and/or channel may be indicated as either a 0 value (e.g., low priority) or a 1 value (e.g., high priority), whereas the priority associated with the sidelink communication and/or channel may be indicated on a scale of 0-10. In this case, UE1 may normalize or convert the priority associated with the sidelink communication and/or channel to the granularity of the priority associated with the uplink communication and/or channel, may normalize or convert the priority associated with the uplink communication and/or channel to the granularity of the priority associated with the sidelink communication and/or channel, or may normalize or convert both priorities to a common granularity. As an example, if the priority associated with the sidelink communication and/or channel (e.g., a PPPP) is indicated on a scale of 0-10, UE1 may convert the priority to a 1 value if the priority satisfies a priority threshold (e.g., a 6 value or above) and may convert the priority to a 0 value if the priority does not satisfy the priority threshold (e.g., a 5 value or below). In some aspects, the priority threshold may be a sidelink priority threshold specified by sl-PriorityThreshold or by another parameter.

In some aspects, UE1 may resolve a collision between an access link communication (e.g., an uplink communication transmission or a downlink communication reception) and a sidelink communication (e.g., a sidelink communication transmission or a sidelink communication reception) based at least in part on the sidelink priority threshold. The sidelink priority threshold may or may not be configured. If the sidelink priority threshold is configured and the access link channel or access link communication is of high priority, then sidelink communication priority or the sidelink channel priority is compared against the sidelink priority threshold. If the sidelink priority threshold is not configured and access link communication or channel is of high priority, then access link communication is kept and the sidelink communication is dropped. If the access link communication or channel is of low priority, and the sidelink priority threshold is configured, then the sidelink communication or channel priority is compared against the sidelink priority threshold.

In some aspects, the priority associated with the uplink communication and/or channel and the priority associated with the sidelink communication and/or channel may be configured based at least in part on various parameters. For example, the priority associated with the uplink communication and/or channel and the priority associated with the sidelink communication and/or channel may be respectively configured based at least in part on a communication type associated with the uplink communication and a communication type associated with the sidelink communication. For example, the priority of a communication and/or channel may be higher relative to the priority of another communication and/or channel if the communication is an urgent or time-sensitive communication such as ultra reliable low latency communication (URLLC), and the other communication is a non-urgent communication such as an enhanced mobile broadband (eMBB) communication. As another example, the priority of a communication and/or channel may be higher relative to the priority of another communication and/or channel if the communication carries HARQ feedback and the other communication carries data. In some aspects, other parameters, or combinations thereof, may be considered when configuring the respective priorities of communications.

In some aspects, UE1 may determine whether to transmit the uplink communication and/or the sidelink communication based at least in part on whether the transmission of the uplink communication and the transmission of the sidelink communication are to occur on a same frequency carrier, a same subcarrier, and/or the like. In some aspects, dropping or refraining from transmitting the sidelink communication or the uplink communication may be a function of a capability of UE1. For example, if UE1 is capable of transmitting both the uplink communication and the sidelink communication, UE1 may determine that UE1 does not need to drop either of the communications. As another example, UE1 may be unable to simultaneously transmit communications on the same frequency carrier, and may determine, based at least in part on the respective priorities, whether to transmit the uplink communication or the sidelink communication and to drop or refrain from transmitting the other communication. As another example, if the transmission of the uplink communication and the transmission of the sidelink communication are to occur on different frequency carriers, different subcarriers, and/or the like, simultaneous transmission of the uplink communication and the sidelink communication across different frequency carriers may cause a phase discontinuity for the transmissions. In this case, UE1 may determine, based at least in part on the respective priorities, whether to suspend transmission of a communication while transmitting the other communication, whether to scale the transmit powers for transmitting the communications, and/or the like.

As an example of the above, if the transmission of the uplink communication and the transmission of the sidelink communication are to occur on the same frequency carrier, UE1 may transmit the sidelink communication, and drop or refrain from transmitting the uplink communication, based at least in part on determining that the priority associated with the sidelink communication and/or channel is higher relative to the priority associated with the uplink communication and/or channel. As another example, if the transmission of the uplink communication and the transmission of the sidelink communication are to occur on the same frequency carrier, UE1 may transmit the uplink communication, and drop or refrain from transmitting the sidelink communication, based at least in part on determining that the priority associated with the uplink communication and/or channel is higher relative to the priority associated with the sidelink communication and/or channel.

As another example, if the transmission of the uplink communication and the transmission of the sidelink communication are to occur on different frequency carriers, UE1 may transmit the sidelink communication at a first transmit power that is greater relative to a second transmit power at which UE1 transmits the uplink communication based at least in part on determining that the priority associated with the sidelink communication and/or channel is higher relative to the priority associated with the uplink communication and/or channel. As another example, if the transmission of the uplink communication and the transmission of the sidelink communication are to occur on different frequency carriers, UE1 may transmit the uplink communication at a first transmit power that is greater relative to a second transmit power at which UE1 transmits the sidelink communication based at least in part on determining that the priority associated with the uplink communication and/or channel is higher relative to the priority associated with the sidelink communication and/or channel.

As another example, the first transmit power and the second transmit power may be determined based at least in part on a priority threshold for the sidelink communication and/or channel (e.g., PPPP threshold or another type of sidelink priority threshold). The sidelink priority threshold may or may not be configured. If the sidelink priority threshold is configured and the access link channel or access link communication is of high priority, then sidelink communication priority or the sidelink channel priority is compared against the sidelink priority threshold. If the sidelink priority threshold is not configured and access link communication or channel is of high priority, then access link communication may be given the greater transmit power and the sidelink communication may be given the lower transmit power. If the access link communication or channel is of low priority, and the sidelink priority threshold is configured, then the sidelink communication or channel priority is compared against the sidelink priority threshold.

As another example, if the transmission of the uplink communication and the transmission of the sidelink communication are to occur on different frequency carriers, UE1 may temporarily suspend transmission of the uplink communication in order to transmit the sidelink communication during the overlapping portions of the uplink communication and the sidelink communication, based at least in part on determining that the priority associated with the sidelink communication and/or channel is higher relative to the priority associated with the uplink communication and/or channel. As another example, if the transmission of the uplink communication and the transmission of the sidelink communication are to occur on different frequency carriers, UE1 may temporarily suspend transmission of the sidelink communication in order to transmit the uplink communication during the overlapping portions of the uplink communication and the sidelink communication, based at least in part on determining that the priority associated with the uplink communication and/or channel is higher relative to the priority associated with the sidelink communication and/or channel.

As another example, if the transmission of the uplink communication and the transmission of the sidelink communication are to occur on different frequency carriers, UE1 may determine whether to transmit one of the communications and drop or refrain from transmitting the other communication based at least in part on the respective priorities. For example, UE1 may determine transmit power on a per-symbol or per-occasion basis. In each occasion, UE1 may determine the sum power over all frequency carriers, and re-scale the power if needed based at least in part on respective priorities. If the sum power is below Pmax (e.g., total transmit power), then UE1 may need not to perform power scaling. Some transmissions may overlap on different frequency carriers, which may create a phase discontinuity in case the transmissions are sent on frequency carriers associated with the same power amplifier. When UE1 is to transmit over the access link and the sidelink, the BS may be aware of the resources that can be used for sidelink but does not know when UE1 will use the resources in some of the operation modes. As a result, UE1 transmits a high priority communication or channel (e.g., spanned from symbol 0 to 13) on the sidelink, and the BS schedules an uplink communication for a low priority channel (e.g., on symbol 4-5). If UE1 follows the scheduling grant from the BS, the sidelink transmission may loses phase continuity and may be unlikely to be decoded successfully. In such a case, even if UE1 is not power limited, UE1 may determine to refrain from transmitting a low priority channel in favor of the high priority channel.

In some cases, if UE1 determines that the priority associated with the sidelink communication and/or channel and the priority associated with the uplink communication and/or channel are a same priority, UE1 may determine whether to transmit the uplink communication and/or the sidelink communication based at least in part on one or more configurable rules (e.g., configurable by the BS, by UE2, and/or other entities). As an example, if the transmission of the uplink communication and the transmission of the sidelink communication are to occur on the same frequency carrier, UE1 may transmit the sidelink communication, and drop or refrain from transmitting the uplink communication, based at least in part on determining that the priority associated with the sidelink communication and/or channel and the priority associated with the uplink communication and/or channel are the same priority. As another example, if the transmission of the uplink communication and the transmission of the sidelink communication are to occur on the same frequency carrier, UE1 may transmit the uplink communication, and drop or refrain from transmitting the sidelink communication, based at least in part on determining that the priority associated with the sidelink communication and/or channel and the priority associated with the uplink communication and/or channel are the same priority.

As another example, if the transmission of the uplink communication and the transmission of the sidelink communication are to occur on different frequency carriers, UE1 may transmit the sidelink communication at a first transmit power and may transmit the uplink communication at a second transmit power (e.g., power scaling, in which case the first transmit power may be greater than, less than the second transmit power, or the same as the second transmit power), based at least in part on determining that the priority associated with the sidelink communication and/or channel and the priority associated with the uplink communication and/or channel are the same priority. As another example, if the transmission of the uplink communication and the transmission of the sidelink communication are to occur on different frequency carriers, UE1 may transmit the uplink communication at a first transmit power and may transmit sidelink communication at a second transmit power (e.g., power scaling, in which case the first transmit power may be greater than, less than the second transmit power, or the same as the second transmit power), based at least in part on determining that the priority associated with the sidelink communication and/or channel and the priority associated with the uplink communication and/or channel are the same priority.

As another example, if the transmission of the uplink communication and the transmission of the sidelink communication are to occur on different frequency carriers, UE1 may temporarily suspend transmission of the uplink communication in order to transmit the sidelink communication during the overlapping portions of the uplink communication and the sidelink communication based at least in part on determining that the priority associated with the sidelink communication and/or channel and the priority associated with the uplink communication and/or channel are the same priority. As another example, if the transmission of the uplink communication and the transmission of the sidelink communication are to occur on different frequency carriers, UE1 may temporarily suspend transmission of the sidelink communication in order to transmit the uplink communication during the overlapping portions of the uplink communication and the sidelink communication, based at least in part on determining that the priority associated with the sidelink communication and/or channel and the priority associated with the uplink communication and/or channel are the same priority.

In some cases, if UE1 determines that the priority associated with the sidelink communication and/or channel and the priority associated with the uplink communication and/or channel are a same priority, UE1 may determine whether to transmit the uplink communication and/or the sidelink communication based at least in part on or more configurable parameters (e.g., configurable by the BS, by UE2, and/or other entities). The one or more configurable parameters may include the respective physical channel types associated with the uplink communication and the sidelink communication, the time-domain resource (e.g., symbol, slot, subframe, radio frame, and/or the like) and/or the frequency-domain resource (e.g., frequency carriers, subcarriers, and/or the like) in which the transmission of the uplink communication and the transmission of the sidelink communication overlap, the respective transmission types associated with the uplink communication and the sidelink communication, and/or other configurable parameters.

As an example, if the transmission of the uplink communication and the transmission of the sidelink communication are to occur on the same frequency carrier, UE1 may transmit the sidelink communication and drop or refrain from transmitting the uplink communication based at least in part on determining that the physical channel type associated with the sidelink communication is a PSFCH and the physical channel type associated with the uplink communication is a physical uplink control channel (PUCCH), based at least in part on determining that the physical channel type associated with the sidelink communication is a physical sidelink shared channel (PSSCH) and the physical channel type associated with the uplink communication is a PUSCH, and/or the like. As another example, if the transmission of the uplink communication and the transmission of the sidelink communication are to occur on the same frequency carrier, UE1 may transmit the uplink communication and drop or refrain from transmitting the sidelink communication based at least in part on determining that the physical channel type associated with the uplink communication is a physical random access channel (PRACH) and the physical channel type associated with the sidelink communication is a PSFCH, based at least in part on determining that the physical channel type associated with the uplink communication is a PUCCH and physical channel type associated with the sidelink communication is a PSSCH, and/or the like.

As another example, if the transmission of the uplink communication and the transmission of the sidelink communication are to occur on different frequency carriers, UE1 may transmit the sidelink communication at a first transmit power that is greater relative to a second transmit power at which UE1 transmits the uplink communication based at least in part on determining that the physical channel type associated with the sidelink communication is a PSFCH and the physical channel type associated with the uplink communication is a PUCCH, based at least in part on determining that the physical channel type associated with the sidelink communication is a PSSCH and the physical channel type associated with the uplink communication is a PUSCH, and/or the like. As another example, if the transmission of the uplink communication and the transmission of the sidelink communication are to occur on different frequency carriers, UE1 may transmit the uplink communication at a first transmit power that is greater relative to a second transmit power at which UE transmits the sidelink communication based at least in part on determining that the physical channel type associated with the uplink communication is a PRACH and the physical channel type associated with the sidelink communication is a PSFCH, based at least in part on determining that the physical channel type associated with the uplink communication is a PUCCH and physical channel type associated with the sidelink communication is a PSSCH, and/or the like.

As another example, if the transmission of the uplink communication and the transmission of the sidelink communication are to occur on different frequency carriers, UE1 may temporarily suspend transmission of the uplink communication in order to transmit the sidelink communication during the overlapping portions of the uplink communication and the sidelink communication based at least in part on determining that the physical channel type associated with the sidelink communication is a PSFCH and the physical channel type associated with the uplink communication is a PUCCH, based at least in part on determining that the physical channel type associated with the sidelink communication is a PSSCH and the physical channel type associated with the uplink communication is a PUSCH, and/or the like. As another example, if the transmission of the uplink communication and the transmission of the sidelink communication are to occur on different frequency carriers, UE1 may temporarily suspend transmission of the sidelink communication in order to transmit the uplink communication during the overlapping portions of the uplink communication and the sidelink communication based at least in part on determining that the physical channel type associated with the uplink communication is a PRACH and the physical channel type associated with the sidelink communication is a PSFCH, based at least in part on determining that the physical channel type associated with the uplink communication is a PUCCH and physical channel type associated with the sidelink communication is a PSSCH, and/or the like.

As another example, if the transmission of the uplink communication and the transmission of the sidelink communication are to occur on the same frequency carrier, UE1 may transmit the sidelink communication and drop or refrain from transmitting the uplink communication based at least in part on determining that the transmission type associated with the sidelink communication is broadcast, groupcast, or multicast. As another example, if the transmission of the uplink communication and the transmission of the sidelink communication are to occur on the same frequency carrier, UE1 may transmit the uplink communication and drop or refrain from transmitting the sidelink communication based at least in part on determining that the transmission type associated with the sidelink communication is unicast.

As another example, if the transmission of the uplink communication and the transmission of the sidelink communication are to occur on different frequency carriers, UE1 may transmit the sidelink communication at a first transmit power that is greater relative to a second transmit power at which UE1 transmits the uplink communication based at least in part on determining that the transmission type associated with the sidelink communication is broadcast, groupcast, or multicast. As another example, if the transmission of the uplink communication and the transmission of the sidelink communication are to occur on different frequency carriers, UE1 may transmit the uplink communication at a first transmit power that is greater relative to a second transmit power at which UE1 transmits the sidelink communication based at least in part on determining that the transmission type associated with the sidelink communication is unicast.

As another example, if the transmission of the uplink communication and the transmission of the sidelink communication are to occur on different frequency carriers, UE1 may temporarily suspend transmission of the uplink communication in order to transmit the sidelink communication during the overlapping portions of the uplink communication and the sidelink communication based at least in part on determining that the transmission type associated with the sidelink communication is broadcast, groupcast, or multicast. As another example, if the transmission of the uplink communication and the transmission of the sidelink communication are to occur on different frequency carriers, UE1 may temporarily suspend transmission of the sidelink communication in order to transmit the uplink communication during the overlapping portions of the uplink communication and the sidelink communication based at least in part on determining that the transmission type associated with the sidelink communication is unicast.

As another example, if the transmission of the uplink communication and the transmission of the sidelink communication are to occur on the same frequency carrier, UE1 may transmit the sidelink communication and drop or refrain from transmitting the uplink communication based at least in part on determining that the time-domain resource, in which the transmission of the sidelink communication and the transmission of the uplink communication overlap, is scheduled for sidelink retransmissions (e.g., HARQ retransmissions), is prioritized for sidelink communications, and/or the like. As another example, if the transmission of the uplink communication and the transmission of the sidelink communication are to occur on the same frequency carrier, UE1 may transmit the uplink communication and drop or refrain from transmitting the sidelink communication based at least in part on determining that the time-domain resource, in which the transmission of the sidelink communication and the transmission of the uplink communication overlap, is not scheduled for sidelink retransmissions, is prioritized for uplink communications, and/or the like.

As another example, if the transmission of the uplink communication and the transmission of the sidelink communication are to occur on different frequency carriers, UE1 may transmit the sidelink communication at a first transmit power that is greater relative to a second transmit power at which UE1 transmits the uplink communication based at least in part on determining that the time-domain resource in which the transmission of the sidelink communication and the transmission of the uplink communication overlap is scheduled for sidelink retransmissions, is prioritized for sidelink communications, and/or the like. As another example, if the transmission of the uplink communication and the transmission of the sidelink communication are to occur on different frequency carriers, UE1 may transmit the uplink communication at a first transmit power that is greater relative to a second transmit power at which UE1 transmits the sidelink communication based at least in part on determining that the time-domain resource in which the transmission of the sidelink communication and the transmission of the uplink communication overlap is not scheduled for sidelink retransmissions, is prioritized for uplink communications, and/or the like.

As another example, if the transmission of the uplink communication and the transmission of the sidelink communication are to occur on different frequency carriers, UE1 may temporarily suspend transmission of the uplink communication in order to transmit the sidelink communication during the overlapping portions of the uplink communication and the sidelink communication based at least in part on determining that the time-domain resource in which the transmission of the sidelink communication and the transmission of the uplink communication overlap is scheduled for sidelink retransmissions, is prioritized for sidelink communications, and/or the like. As another example, if the transmission of the uplink communication and the transmission of the sidelink communication are to occur on different frequency carriers, UE1 may temporarily suspend transmission of the sidelink communication in order to transmit the uplink communication during the overlapping portions of the uplink communication and the sidelink communication based at least in part on determining that the time-domain resource in which the transmission of the sidelink communication and the transmission of the uplink communication overlap is not scheduled for sidelink retransmissions, is prioritized for uplink communications, and/or the like.

In some aspects, UE1 may revert to LTE parameters or rules for determining whether to transmit the uplink communication and/or the sidelink communication, in which case UE1 may determine whether to transmit the uplink communication and/or the sidelink communication based at least in part on only the priority associated with the sidelink communication and/or channel. This may occur, for example, where no urgent or time-sensitive communications are scheduled to be transmitted by the UE.

In this way, a UE (e.g., UE1) may be configured to resolve collisions between access link communications and sidelink communications based at least in part on respective priorities associated with the access link communications and sidelink communications. Moreover, the UE may be configured to resolve collisions between access link communications and sidelink communications based at least in part on other parameters if, for example, the access link communications and/or channels and the sidelink communications and/or channels are associated with the same priority. In this way, the UE is capable of resolving collisions by determining whether to drop an access link communication or a sidelink communication (and whether to transmit or receive the access link communication or the sidelink communication), determining respective transmit powers for the access link communication and the sidelink communication, and/or the like based at least in part on the respective priorities and/or other parameters. This may reduce and/or prevent delayed or dropped urgent or time-sensitive communications and/or high priority channels, may reduce and/or prevent delayed or dropped HARQ retransmissions, may reduce or prevent phase discontinuities between access link communication transmissions and sidelink communication transmissions, and/or the like.

As indicated above, FIG. 5 is provided as one or more examples. Other examples may differ from what is described with respect to FIG. 5.

Figure 6:
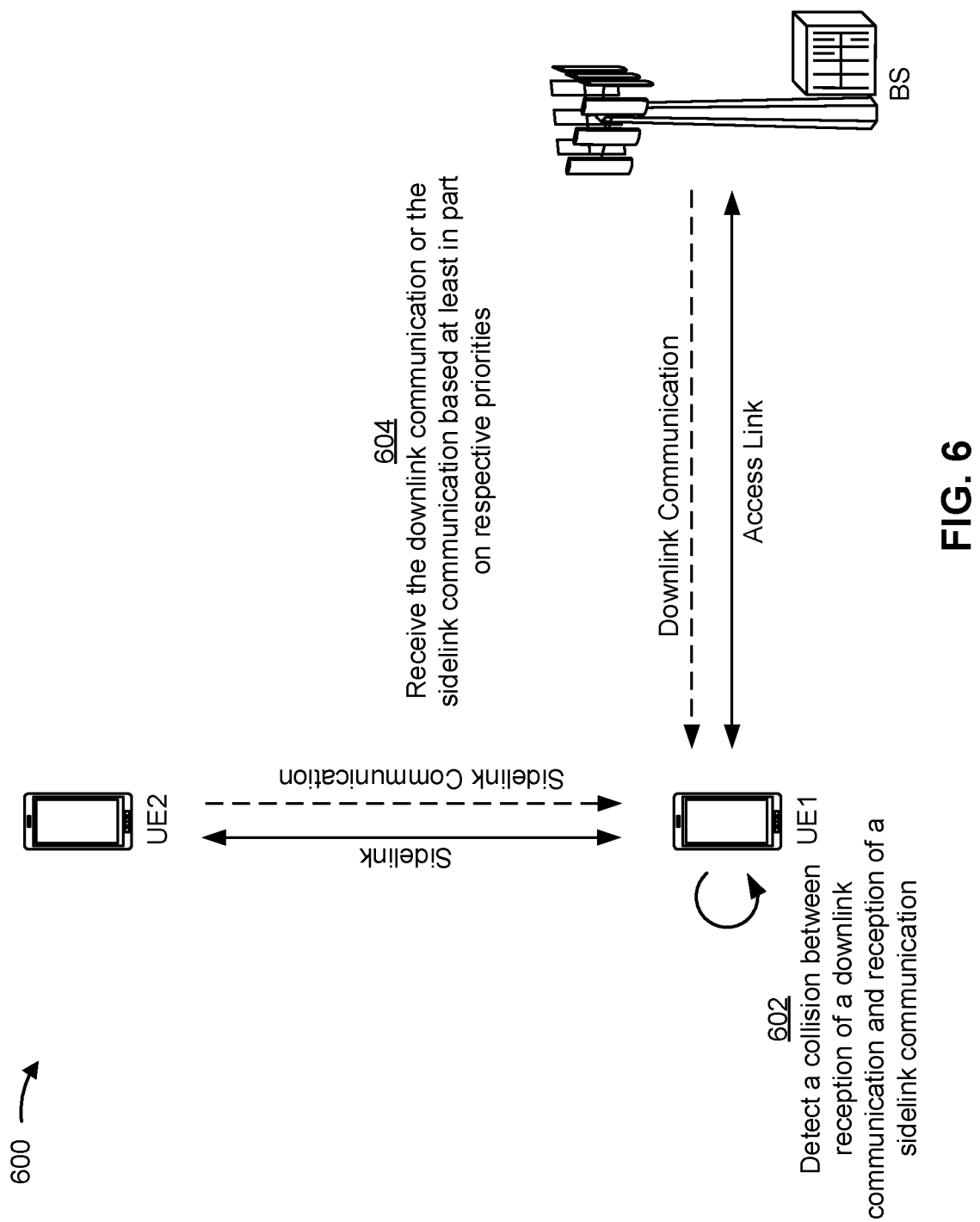

FIG. 6 is a diagram illustrating one or more examples 600 of handling collisions between access link communications and sidelink communications, in accordance with various aspects of the present disclosure. As shown in FIG. 6, examples 600 may include access link communication between the BS and UE1, and/or sidelink communication between UE1 and UE2.

As shown in FIG. 6, and by reference number 602, UE1 may detect a collision between a scheduled reception of a downlink communication from the BS and a scheduled reception of a sidelink communication from UE2. UE1 may detect the collision based at least in part on determining that the reception of the downlink communication and the reception of the sidelink communication at least partially overlap in the time domain. For example, the reception of the downlink communication and the reception of the sidelink communication may at least partially overlap in one or more symbols, one or more slots, one or more subframes, one or more radio frames, and/or the like.

As further shown in FIG. 6, and by reference number 604, UE1 may, based at least in part on detecting the collision, receive the downlink communication or the sidelink communication based at least in part on respective priorities associated with the downlink communication and the sidelink communication. In some aspects, UE1 may determine the priority associated with the downlink communication and/or channel and the priority associated with the sidelink communication and/or channel based at least in part on one or more techniques described above in connection with FIG. 5. In some aspects, UE1 may take into account the respective priorities of the sidelink communication and/or channel and the downlink communication and/or channel based at least in part on UE being configured with URLLC (e.g., configured with capability 2 timeline of any cell or if there is a parameter that determines the high priority of channels and that is configured).

In some aspects, UE1 may determine whether to receive the downlink communication or the sidelink communication based at least in part on whether the reception of the downlink communication and the reception of the sidelink communication are to occur on a same frequency carrier, a same subcarrier, and/or the like. In some aspects, dropping or refraining from receiving the sidelink communication or the downlink communication may be a function of a capability of UE1. For example, if UE1 is capable of receiving both the downlink communication and the sidelink communication, UE1 may determine that UE1 does not need to drop either of the communications. As another example, UE1 may be unable to simultaneously receive and process communications on the same frequency carrier, and may determine, based at least in part on the respective priorities, whether to receive the downlink communication or the sidelink communication and to drop or refrain from receiving the other communication. As an example, UE1 may receive the sidelink communication and drop or refrain from receiving the downlink communication based at least in part on determining that the priority associated with the sidelink communication and/or channel is higher relative to the priority associated with the downlink communication and/or channel. As another example, UE1 may receive the downlink communication and drop or refrain from receiving the sidelink communication based at least in part on determining that the priority associated with the downlink communication and/or channel is higher relative to the priority associated with the sidelink communication and/or channel.

In some cases, if UE1 determines that the priority associated with the sidelink communication and/or channel and the priority associated with the downlink communication and/or channel are a same priority, UE1 may determine whether to receive the downlink communication or the sidelink communication based at least in part on one or more configurable rules (e.g., configurable by the BS, by UE2, and/or other entities). As an example, UE1 may receive the sidelink communication and drop or refrain from receiving the downlink communication based at least in part on determining that the priority associated with the sidelink communication and/or channel and the priority associated with the downlink communication and/or channel are the same priority. As another example, UE1 may receive the downlink communication and drop or refrain from receiving the sidelink communication based at least in part on determining that the priority associated with the sidelink communication and/or channel and the priority associated with the downlink communication and/or channel are the same priority.

In some cases, if UE1 determines that the priority associated with the sidelink communication and/or channel and the priority associated with the downlink communication and/or channel are a same priority, UE1 may determine whether to receive the downlink communication or the sidelink communication based at least in part on or more configurable parameters (e.g., configurable by the BS, by UE2, and/or other entities). The one or more configurable parameters may include the respective physical channel types associated with the downlink communication and the sidelink communication, the time-domain resource and/or the frequency-domain resource in which the reception of the downlink communication and the reception of the sidelink communication overlap, the respective transmission types associated with the downlink communication and the sidelink communication, and/or other configurable parameters.

As an example, UE1 may receive the sidelink communication and drop or refrain from receiving the downlink communication based at least in part on determining that the physical channel type associated with the sidelink communication is a PSFCH and the physical channel type associated with the downlink communication is a physical downlink control channel (PDCCH), based at least in part on determining that the physical channel type associated with the sidelink communication is a PSSCH and the physical channel type associated with the downlink communication is a physical downlink shared channel (PDSCH), and/or the like. As another example, UE1 may receive the downlink communication and drop or refrain from receiving the sidelink communication based at least in part on determining that the physical channel type associated with the downlink communication is a PRACH and the physical channel type associated with the sidelink communication is a PSFCH, based at least in part on determining that the physical channel type associated with the downlink communication is a PDCCH and physical channel type associated with the sidelink communication is a PSSCH, and/or the like.

As another example, UE1 may receive the sidelink communication and drop or refrain from receiving the downlink communication based at least in part on determining that the transmission type associated with the sidelink communication is broadcast, groupcast, or multicast. As another example, UE1 may receive the downlink communication and drop or refrain from receiving the sidelink communication based at least in part on determining that the transmission type associated with the sidelink communication is unicast.

As another example, UE1 may receive the sidelink communication and drop or refrain from receiving the downlink communication based at least in part on determining that the time-domain resource in which the reception of the sidelink communication and the reception of the downlink communication overlap is scheduled for sidelink retransmissions, is prioritized for sidelink communications, and/or the like. As another example, UE1 may receive the downlink communication and drop or refrain from receiving the sidelink communication based at least in part on determining that the time-domain resource in which the reception of the sidelink communication and the reception of the downlink communication overlap is not scheduled for sidelink retransmissions, is prioritized for downlink communications, and/or the like.

As indicated above, FIG. 6 is provided as one or more examples. Other examples may differ from what is described with respect to FIG. 6.

Figure 7:
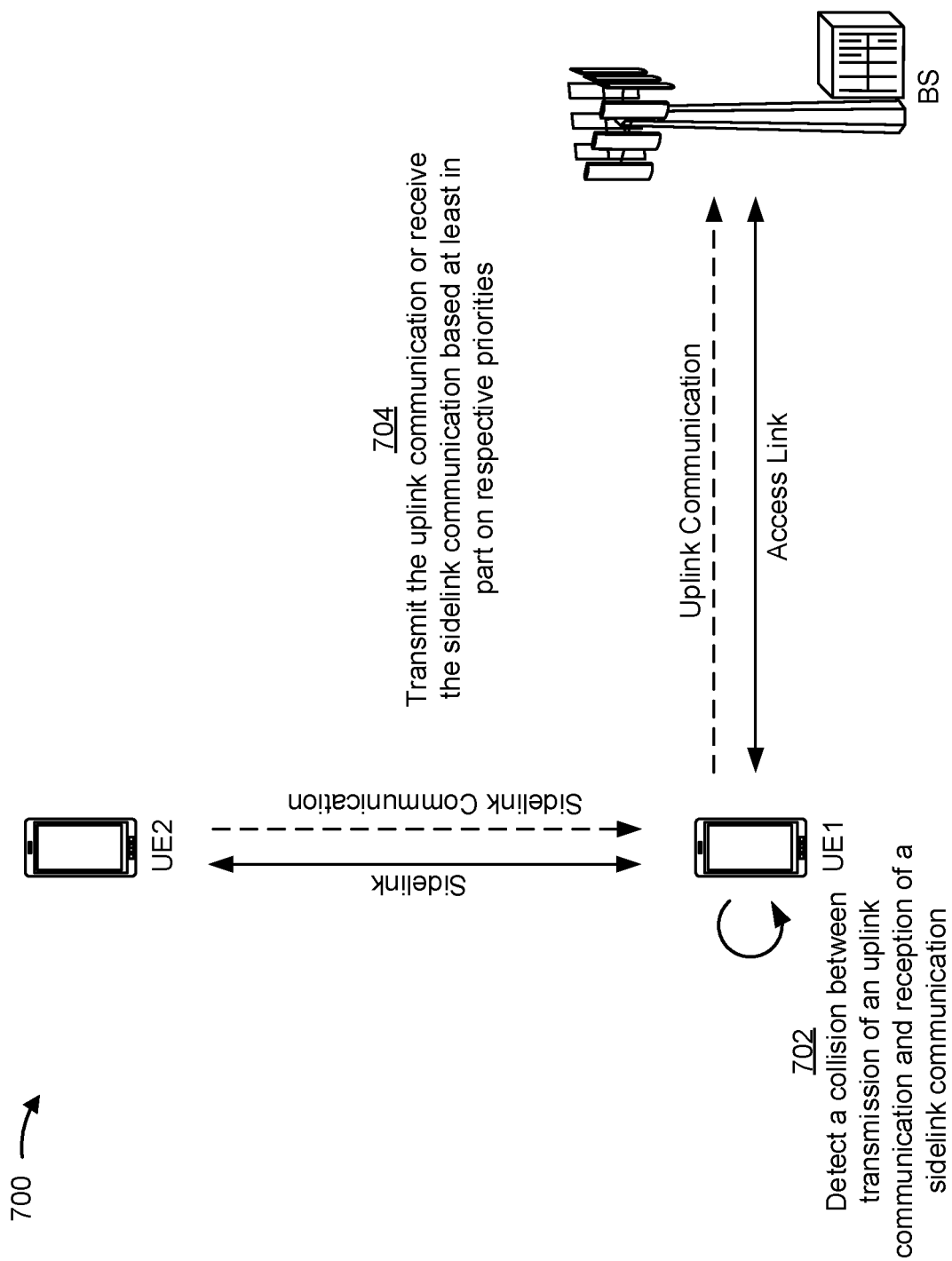

FIG. 7 is a diagram illustrating one or more examples 700 of handling collisions between access link communications and sidelink communications, in accordance with various aspects of the present disclosure. As shown in FIG. 7, examples 700 may include access link communication between the BS and UE1, and/or sidelink communication between UE1 and UE2.

As shown in FIG. 7, and by reference number 702, UE1 may detect a collision between a scheduled transmission of an uplink communication to the BS and a scheduled reception of a sidelink communication from UE2. UE1 may detect the collision based at least in part on determining that the transmission of the uplink communication and the reception of the sidelink communication at least partially overlap in the time domain. For example, the transmission of the uplink communication and the reception of the sidelink communication may at least partially overlap in one or more symbols, one or more slots, one or more subframes, one or more radio frames, and/or the like.

As further shown in FIG. 7, and by reference number 704, UE1 may, based at least in part on detecting the collision, transmit the uplink communication or receive the sidelink communication based at least in part on respective priorities associated with the uplink communication and the sidelink communication. In some aspects, UE1 may determine the priority associated with the uplink communication and/or channel and the priority associated with the sidelink communication and/or channel based at least in part on one or more techniques described above in connection with FIG. 5. In some aspects, UE1 may take into account the respective priorities of the sidelink communication and/or channel and the uplink communication and/or channel based at least in part on UE1 being configured with URLLC (e.g., configured with capability 2 timeline of any cell or if there is a parameter that determines the high priority of channels and that is configured).

In some aspects, UE1 may determine whether to transmit the uplink communication or receive the sidelink communication based at least in part on whether the transmission of the uplink communication and the reception of the sidelink communication are to occur on a same frequency carrier, a same subcarrier, and/or the like. In some aspects, dropping or refraining from receiving the sidelink communication or dropping or refraining from transmitting the uplink communication may be a function of a capability of UE1. For example, if UE1 is capable of transmitting the uplink communication and receiving the sidelink communication, UE1 may determine that UE1 does not need to drop either of the communications. As another example, UE1 may be unable to simultaneously transmit and receive a plurality of communications on the same frequency carrier, and may determine, based at least in part on the respective priorities, whether to transmit the uplink communication or receive the sidelink communication and to drop or refrain from transmitting or receiving the other communication. As an example, UE1 may receive the sidelink communication and drop or refrain from transmitting the uplink communication based at least in part on determining that the priority associated with the sidelink communication and/or channel is higher relative to the priority associated with the uplink communication and/or channel. As another example, UE1 may transmit the uplink communication and drop or refrain from receiving the sidelink communication based at least in part on determining that the priority associated with the uplink communication and/or channel is higher relative to the priority associated with the sidelink communication and/or channel. As another example, if downlink symbols are indicated as being available for sidelink transmission, then, if there is a downlink communication scheduled over the access link, and UE1 is to transmit a sidelink communication over the sidelink on the same symbol, the access link may have the higher priority.

In some cases, if UE1 determines that the priority associated with the sidelink communication and/or channel and the priority associated with the uplink communication and/or channel are a same priority, UE1 may determine whether to transmit the uplink communication or receive the sidelink communication based at least in part on one or more configurable rules (e.g., configurable by the BS, by UE2, and/or other entities). As an example, UE1 may receive the sidelink communication and drop or refrain from transmitting the uplink communication based at least in part on determining that the priority associated with the sidelink communication and/or channel and the priority associated with the uplink communication and/or channel are the same priority. As another example, UE1 may transmit the uplink communication and drop or refrain from receiving the sidelink communication based at least in part on determining that the priority associated with the sidelink communication and/or channel and the priority associated with the uplink communication and/or channel are the same priority.

In some cases, if UE1 determines that the priority associated with the sidelink communication and/or channel and the priority associated with the uplink communication and/or channel are a same priority, UE1 may determine whether to transmit the uplink communication or receive the sidelink communication based at least in part on or more configurable parameters (e.g., configurable by the BS, by UE2, and/or other entities). The one or more configurable parameters may include the respective physical channel types associated with the uplink communication and the sidelink communication, the time-domain resource and/or the frequency-domain resource in which the transmission of the uplink communication and the reception of the sidelink communication overlap, the respective transmission types associated with the uplink communication and the sidelink communication, and/or other configurable parameters.

As an example, UE1 may receive the sidelink communication and drop or refrain from transmitting the uplink communication based at least in part on determining that the physical channel type associated with the sidelink communication is a PSFCH and the physical channel type associated with the uplink communication is a PUCCH, based at least in part on determining that the physical channel type associated with the sidelink communication is a PSSCH and the physical channel type associated with the uplink communication is a PUSCH, and/or the like. As another example, UE1 may transmit the uplink communication and drop or refrain from receiving the sidelink communication based at least in part on determining that the physical channel type associated with the uplink communication is a PRACH and the physical channel type associated with the sidelink communication is a PSFCH, based at least in part on determining that the physical channel type associated with the uplink communication is a PUCCH and physical channel type associated with the sidelink communication is a PSSCH, and/or the like.

As another example, UE1 may receive the sidelink communication and drop or refrain from transmitting the uplink communication based at least in part on determining that the transmission type associated with the sidelink communication is broadcast, groupcast, or multicast. As another example, UE1 may transmit the uplink communication and drop or refrain from receiving the sidelink communication based at least in part on determining that the transmission type associated with the sidelink communication is unicast.

As another example, UE1 may receive the sidelink communication and drop or refrain from transmitting the uplink communication based at least in part on determining that the time-domain resource in which the reception of the sidelink communication and the transmission of the uplink communication overlap is scheduled for sidelink retransmissions, is prioritized for sidelink communications, and/or the like. As another example, UE1 may transmit the uplink communication and drop or refrain from receiving the sidelink communication based at least in part on determining that the time-domain resource in which the reception of the sidelink communication and the transmission of the uplink communication overlap is not scheduled for sidelink retransmissions, is prioritized for uplink communications, and/or the like.

As indicated above, FIG. 7 is provided as one or more examples. Other examples may differ from what is described with respect to FIG. 7.

Figure 8:
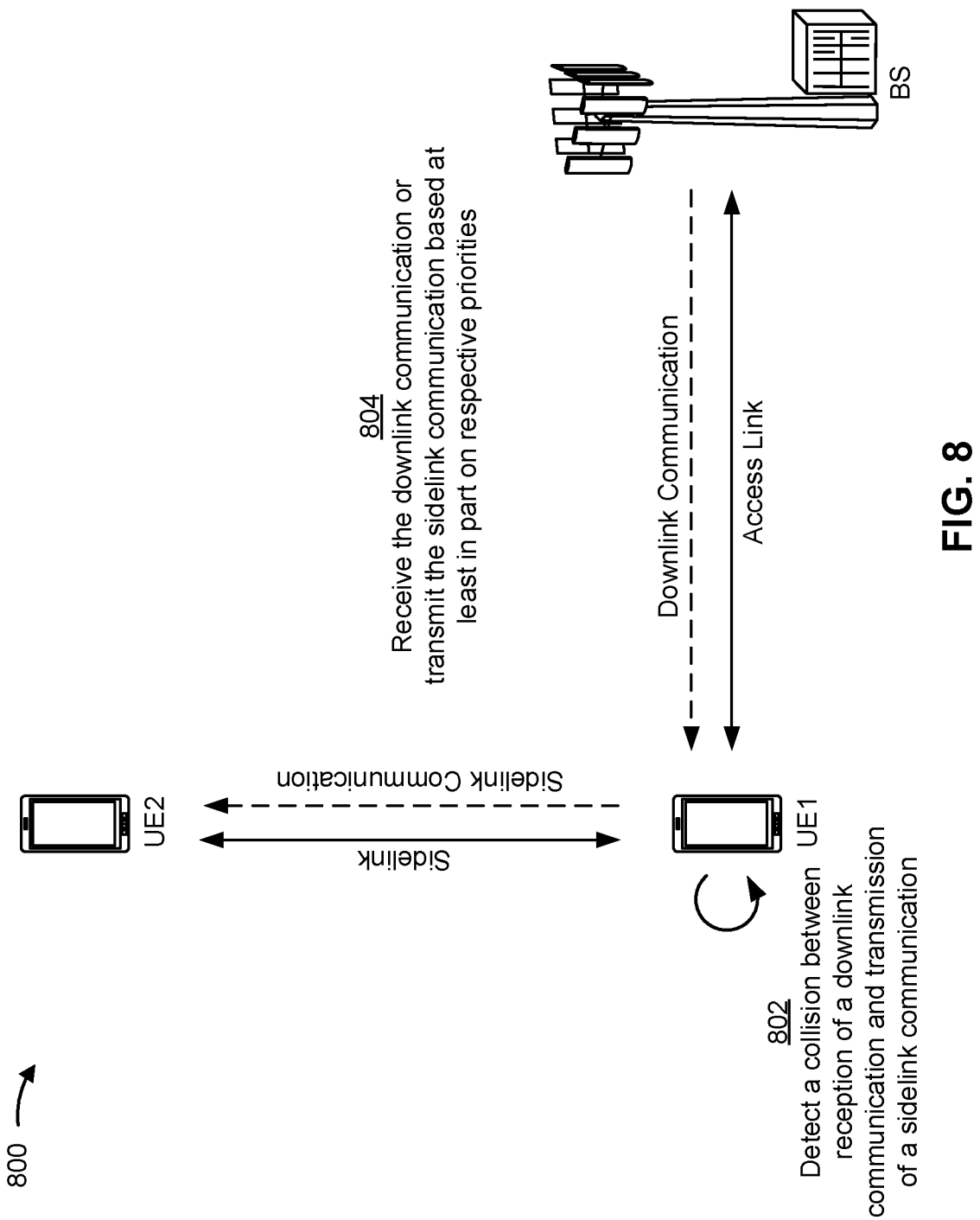

FIG. 8 is a diagram illustrating one or more examples 800 of handling collisions between access link communications and sidelink communications, in accordance with various aspects of the present disclosure. As shown in FIG. 8, examples 800 may include access link communication between the BS and UE1, and/or sidelink communication between UE1 and UE2.

As shown in FIG. 8, and by reference number 802, UE1 may detect a collision between a scheduled reception of a downlink communication from the BS and a scheduled transmission of a sidelink communication to UE2. UE1 may detect the collision based at least in part on determining that the reception of the downlink communication and the transmission of the sidelink communication at least partially overlap in the time domain. For example, the reception of the downlink communication and the transmission of the sidelink communication may at least partially overlap in one or more symbols, one or more slots, one or more subframes, one or more radio frames, and/or the like.

As further shown in FIG. 8, and by reference number 804, UE1 may, based at least in part on detecting the collision, receive the downlink communication or transmit the sidelink communication based at least in part on respective priorities associated with the downlink communication and the sidelink communication. In some aspects, UE1 may determine the priority associated with the downlink communication and/or channel and the priority associated with the sidelink communication and/or channel based at least in part on one or more techniques described above in connection with FIG. 5. In some aspects, UE1 may take into account the respective priorities of the sidelink communication and/or channel and the downlink communication and/or channel based at least in part on UE1 being configured with URLLC (e.g., configured with capability 2 timeline of any cell or if there is a parameter that determines the high priority of channels and that is configured).

In some aspects, UE1 may determine whether to receive the downlink communication or the sidelink communication based at least in part on whether the reception of the downlink communication and the reception of the sidelink communication are to occur on a same frequency carrier, a same subcarrier, and/or the like. In some aspects, dropping or refraining from transmitting the sidelink communication or dropping or refraining from receiving the downlink communication may be a function of a capability of UE1. For example, if UE1 is capable of transmitting the sidelink communication and receiving the downlink communication, UE1 may determine that UE1 does not need to drop either of the communications. As another example, UE1 may be unable to simultaneously receive and transmit a plurality of communications on the same frequency carrier, and may determine, based at least in part on the respective priorities, whether to receive the downlink communication or transmit the sidelink communication and to drop or refrain from receiving or transmitting the other communication. As an example, UE1 may transmit the sidelink communication and drop or refrain from receiving the downlink communication based at least in part on determining that the priority associated with the sidelink communication and/or channel is higher relative to the priority associated with the downlink communication and/or channel. As another example, UE1 may receive the downlink communication and drop or refrain from transmitting the sidelink communication based at least in part on determining that the priority associated with the downlink communication and/or channel is higher relative to the priority associated with the sidelink communication and/or channel.

In some cases, if UE1 determines that the priority associated with the sidelink communication and/or channel and the priority associated with the downlink communication and/or channel are a same priority, UE1 may determine whether to receive the downlink communication or transmit the sidelink communication based at least in part on one or more configurable rules (e.g., configurable by the BS, by UE2, and/or other entities). As an example, UE1 may transmit the sidelink communication and drop or refrain from receiving the downlink communication based at least in part on determining that the priority associated with the sidelink communication and/or channel and the priority associated with the downlink communication and/or channel are the same priority. As another example, UE1 may receive the downlink communication and drop or refrain from transmitting the sidelink communication based at least in part on determining that the priority associated with the sidelink communication and/or channel and the priority associated with the downlink communication and/or channel are the same priority.

In some cases, if UE1 determines that the priority associated with the sidelink communication and/or channel and the priority associated with the downlink communication and/or channel are a same priority, UE1 may determine whether to receive the downlink communication or the sidelink communication based at least in part on or more configurable parameters (e.g., configurable by the BS, by UE2, and/or other entities). The one or more configurable parameters may include the respective physical channel types associated with the downlink communication and the sidelink communication, the time-domain resource and/or the frequency-domain resource in which the reception of the downlink communication and the transmission of the sidelink communication overlap, the respective transmission types associated with the downlink communication and the sidelink communication, and/or other configurable parameters.

As an example, UE1 may transmit the sidelink communication and drop or refrain from receiving the downlink communication based at least in part on determining that the physical channel type associated with the sidelink communication is a PSFCH and the physical channel type associated with the downlink communication is a PDCCH, based at least in part on determining that the physical channel type associated with the sidelink communication is a PSSCH and the physical channel type associated with the downlink communication is a PDSCH, and/or the like. As another example, UE1 may receive the downlink communication and drop or refrain from transmitting the sidelink communication based at least in part on determining that the physical channel type associated with the downlink communication is a PRACH and the physical channel type associated with the sidelink communication is a PSFCH, based at least in part on determining that the physical channel type associated with the downlink communication is a PDCCH and physical channel type associated with the sidelink communication is a PSSCH, and/or the like.

As another example, UE1 may receive the sidelink communication and drop or refrain from receiving the downlink communication based at least in part on determining that the transmission type associated with the sidelink communication is broadcast, groupcast, or multicast. As another example, UE1 may receive the downlink communication and drop or refrain from receiving the sidelink communication based at least in part on determining that the transmission type associated with the sidelink communication is unicast.

As another example, UE1 may receive the sidelink communication and drop or refrain from receiving the downlink communication based at least in part on determining that the time-domain resource in which the transmission of the sidelink communication and the reception of the downlink communication overlap is scheduled for sidelink retransmissions, is prioritized for sidelink communications, and/or the like. As another example, UE1 may receive the downlink communication and drop or refrain from transmitting the sidelink communication based at least in part on determining that the time-domain resource in which the transmission of the sidelink communication and the reception of the downlink communication overlap is not scheduled for sidelink retransmissions, is prioritized for downlink communications, and/or the like.

As indicated above, FIG. 8 is provided as one or more examples. Other examples may differ from what is described with respect to FIG. 8.

Figure 9:
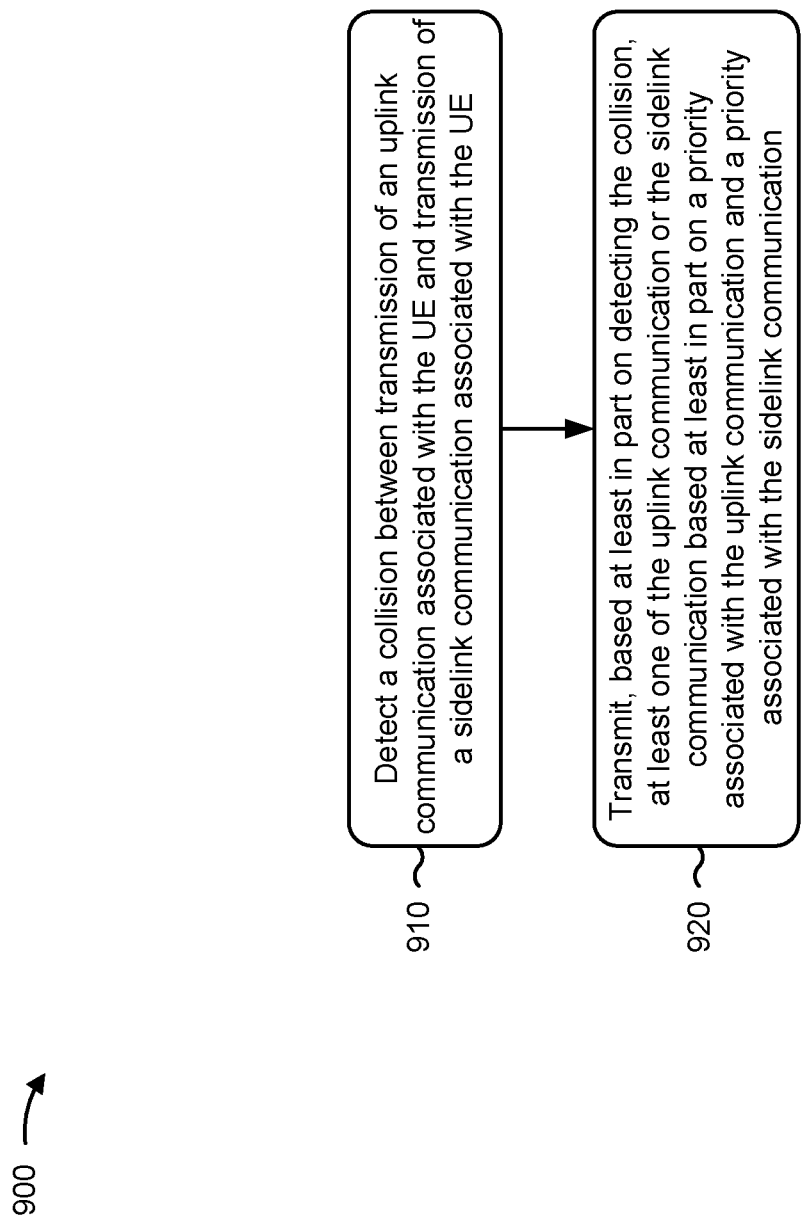
FIGS. 9-12 are diagrams illustrating example processes performed, for example, by a UE, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs operations associated with handling collisions between access link communications and sidelink communications.

As shown in FIG. 9, in some aspects, process 900 may include detecting a collision between transmission of an uplink communication associated with the UE and transmission of a sidelink communication associated with the UE (block 910). For example, the UE (e.g., using receive processor 258, transmit processor 264, controller/processor 280, memory 282, and/or the like) may detect a collision between transmission of an uplink communication associated with the UE and transmission of a sidelink communication associated with the UE, as described above.

As further shown in FIG. 9, in some aspects, process 900 may include transmitting, based at least in part on detecting the collision, at least one of the uplink communication or the sidelink communication based at least in part on a priority associated with the uplink communication and a priority associated with the sidelink communication (block 920). For example, the UE (e.g., using receive processor 258, transmit processor 264, controller/processor 280, memory 282, and/or the like) may transmit, based at least in part on detecting the collision, at least one of the uplink communication or the sidelink communication based at least in part on a priority associated with the uplink communication and a priority associated with the sidelink communication, as described above.

Process 900 may include additional aspects, such as any single aspect or any combination of aspects described below and/or in connection with one or more other processes described elsewhere herein.

In a first aspect, detecting the collision comprises determining that the transmission of the uplink communication and the transmission of the sidelink communication are to occur on a same frequency carrier and determining that the transmission of the uplink communication and the transmission of the sidelink communication at least partially overlap in a time domain. In a second aspect, alone or in combination with the first aspect, process 900 further comprises determining that the priority associated with the sidelink communication is higher relative to the priority associated with the uplink communication, and transmitting at least one of the uplink communication or the sidelink communication comprises transmitting the sidelink communication based at least in part on determining that the priority associated with the sidelink communication is higher relative to the priority associated with the uplink communication.

In a third aspect, alone or in combination with one or more of the first and second aspects, process 900 further comprises determining that the priority associated with the uplink communication is higher relative to the priority associated with the sidelink communication, and transmitting at least one of the uplink communication or the sidelink communication comprises transmitting the uplink communication based at least in part on determining that the priority associated with the uplink communication is higher relative to the priority associated with the sidelink communication. In a fourth aspect, alone or in combination with one or more of the first through third aspects, process 900 further comprises determining that the priority associated with the uplink communication and the priority associated with the sidelink communication are a same priority, and transmitting at least one of the uplink communication or the sidelink communication comprises transmitting the sidelink communication based at least in part on determining that the priority associated with the uplink communication and the priority associated with the sidelink communication are the same priority.

In a fifth aspect, alone or in combination with one or more of the first through fourth aspects, process 900 further comprises determining that the priority associated with the uplink communication and the priority associated with the sidelink communication are a same priority, and transmitting at least one of the uplink communication or the sidelink communication comprises transmitting the uplink communication based at least in part on determining that the priority associated with the uplink communication and the priority associated with the sidelink communication are the same priority.

In a sixth aspect, alone or in combination with one or more of the first through fifth aspects, process 900 further comprises determining that the priority associated with the uplink communication and the priority associated with the sidelink communication are a same priority, and transmitting at least one of the uplink communication or the sidelink communication comprises transmitting, based at least in part on determining that the priority associated with the uplink communication and the priority associated with the sidelink communication are the same priority, the uplink communication or the sidelink communication based at least in part on a physical channel type associated with the uplink communication and a physical channel type associated with the sidelink communication. In a seventh aspect, alone or in combination with one or more of the first through sixth aspects, transmitting the uplink communication or the sidelink communication comprises transmitting the uplink communication based at least in part on the physical channel type associated with the uplink communication being a PRACH and the physical channel type associated with the sidelink communication being a PSFCH.

In an eighth aspect, alone or in combination with one or more of the first through seventh aspects, transmitting the uplink communication or the sidelink communication comprises transmitting the sidelink communication based at least in part on the physical channel type associated with the sidelink communication being a PSFCH and the physical channel type associated with the uplink communication being a PUCCH. In a ninth aspect, alone or in combination with one or more of the first through eighth aspects, transmitting the uplink communication or the sidelink communication comprises transmitting the uplink communication based at least in part on the physical channel type associated with the uplink communication being a PUCCH and physical channel type associated with the sidelink communication being a PSSCH.

In a tenth aspect, alone or in combination with one or more of the first through ninth aspects, transmitting the uplink communication or the sidelink communication comprises transmitting the sidelink communication based at least in part on the physical channel type associated with the sidelink communication being a PSSCH and the physical channel type associated with the uplink communication being a PUSCH.

In an eleventh aspect, alone or in combination with one or more of the first through tenth aspects, process 900 further comprises determining that the priority associated with the uplink communication and the priority associated with the sidelink communication are a same priority, and transmitting at least one of the uplink communication or the sidelink communication comprises transmitting, based at least in part on determining that the priority associated with the uplink communication and the priority associated with the sidelink communication are the same priority, the uplink communication or the sidelink communication based at least in part on a transmission type associated with the sidelink communication. In a twelfth aspect, alone or in combination with one or more of the first through eleventh aspects, transmitting the uplink communication or the sidelink communication comprises transmitting the sidelink communication based at least in part on the transmission type associated with the sidelink communication being broadcast, groupcast, or multicast.

In a thirteenth aspect, alone or in combination with one or more of the first through twelfth aspects, transmitting the uplink communication or the sidelink communication comprises transmitting the uplink communication based at least in part on the transmission type associated with the sidelink communication being unicast. In a fourteenth aspect, alone or in combination with one or more of the first through thirteenth aspects, process 900 further comprises determining that the priority associated with the uplink communication and the priority associated with the sidelink communication are a same priority, and transmitting at least one of the uplink communication or the sidelink communication comprises transmitting, based at least in part on determining that the priority associated with the uplink communication and the priority associated with the sidelink communication are the same priority, the uplink communication or the sidelink communication based at least in part on a time-domain resource in which the transmission of the sidelink communication and the transmission of the uplink communication at least partially overlap.

In a fifteenth aspect, alone or in combination with one or more of the first through fourteenth aspects, transmitting the uplink communication or the sidelink communication comprises transmitting the sidelink communication based at least in part on the time-domain resource being scheduled for sidelink retransmissions. In a sixteenth aspect, alone or in combination with one or more of the first through fifteenth aspects, detecting the collision comprises determining that the transmission of the uplink communication and the transmission of the sidelink communication are to occur on different frequency carriers; and determining that the transmission of the uplink communication and the transmission of the sidelink communication at least partially overlap in a time domain.

In a seventeenth aspect, alone or in combination with one or more of the first through sixteenth aspects, process 900 further comprises determining that the priority associated with the sidelink communication is higher relative to the priority associated with the uplink communication, and transmitting at least one of the uplink communication or the sidelink communication comprises transmitting the sidelink communication at a first transmit power and transmitting the uplink communication at a second transmit power, the first transmit power being greater relative to the second transmit power based at least in part on the priority associated with the sidelink communication being higher relative to the priority associated with the uplink communication. In an eighteenth aspect, alone or in combination with one or more of the first through seventeenth aspects, process 900 further comprises determining that the priority associated with the uplink communication is higher relative to the priority associated with the sidelink communication, and transmitting at least one of the uplink communication or the sidelink communication comprises transmitting the uplink communication at a first transmit power and transmitting the sidelink communication at a second transmit power, the first transmit power being greater relative to the second transmit power based at least in part on the priority associated with the uplink communication being higher relative to the priority associated with the sidelink communication.

In a nineteenth aspect, alone or in combination with one or more of the first through eighteenth aspects, process 900 further comprises determining that the priority associated with the uplink communication and the priority associated with the sidelink communication are a same priority, and transmitting at least one of the uplink communication or the sidelink communication comprises transmitting the sidelink communication at a first transmit power and transmitting the uplink communication at a second transmit power, the first transmit power being greater relative to the second transmit power based at least in part on the priority associated with the uplink communication and the priority associated with the sidelink communication being the same priority. In a twentieth aspect, alone or in combination with one or more of the first through nineteenth aspects, process 900 further comprises determining that the priority associated with the uplink communication and the priority associated with the sidelink communication are a same priority, and transmitting at least one of the uplink communication or the sidelink communication comprises transmitting the uplink communication at a first transmit power and transmitting the sidelink communication at a second transmit power, the first transmit power being greater relative to the second transmit power based at least in part on the priority associated with the uplink communication and the priority associated with the sidelink communication being the same priority.

In a twenty-first aspect, alone or in combination with one or more of the first through twentieth aspects, process 900 further comprises determining that the priority associated with the uplink communication and the priority associated with the sidelink communication are a same priority, and transmitting at least one of the uplink communication or the sidelink communication comprises transmitting, based at least in part on determining that the priority associated with the uplink communication and the priority associated with the sidelink communication are the same priority, the uplink communication at a first transmit power and transmitting, based at least in part on determining that the priority associated with the uplink communication and the priority associated with the sidelink communication are the same priority, the sidelink communication at a second transmit power, the first transmit power and the second transmit power being based at least in part on a physical channel type associated with the uplink communication and a physical channel type associated with the sidelink communication.

In a twenty-second aspect, alone or in combination with one or more of the first through twenty-first aspects, process 900 further comprises determining that the priority associated with the uplink communication and the priority associated with the sidelink communication are a same priority, and transmitting at least one of the uplink communication or the sidelink communication comprises transmitting, based at least in part on determining that the priority associated with the uplink communication and the priority associated with the sidelink communication are the same priority, the uplink communication at a first transmit power and transmitting, based at least in part on determining that the priority associated with the uplink communication and the priority associated with the sidelink communication are the same priority, the sidelink communication at a second transmit power, the first transmit power and the second transmit power being based at least in part on a transmission type associated with the sidelink communication.

In a twenty-third aspect, alone or in combination with one or more of the first through twenty-second aspects, process 900 further comprises determining that the priority associated with the uplink communication and the priority associated with the sidelink communication are a same priority, and transmitting at least one of the uplink communication or the sidelink communication comprises transmitting, based at least in part on determining that the priority associated with the uplink communication and the priority associated with the sidelink communication are the same priority, the uplink communication at a first transmit power and transmitting, based at least in part on determining that the priority associated with the uplink communication and the priority associated with the sidelink communication are the same priority, the sidelink communication at a second transmit power, the first transmit power and the second transmit power being based at least in part on a time-domain resource in which the transmission of the sidelink communication and the transmission of the uplink communication at least partially overlap.

In a twenty-fourth aspect, alone or in combination with one or more of the first through twenty-third aspects, process 900 further comprises determining that the priority associated with the sidelink communication is higher relative to the priority associated with the uplink communication, and transmitting at least one of the uplink communication or the sidelink communication comprises temporarily suspending the transmission of the uplink communication to transmit the sidelink communication based at least in part on determining that the priority associated with the sidelink communication is higher relative to the priority associated with the uplink communication. In a twenty-fifth aspect, alone or in combination with one or more of the first through twenty-fourth aspects, process 900 further comprises determining that the priority associated with the uplink communication is higher relative to the priority associated with the sidelink communication, and transmitting at least one of the uplink communication or the sidelink communication comprises temporarily suspending the transmission of the sidelink communication to transmit the uplink communication based at least in part on determining that the priority associated with the uplink communication is higher relative to the priority associated with the sidelink communication.

In a twenty-sixth aspect, alone or in combination with one or more of the first through twenty-fifth aspects, process 900 further comprises determining whether a PPPP associated with the sidelink communication satisfies a threshold and determining the priority associated with the sidelink communication based at least in part on determining whether the PPPP associated with the sidelink communication satisfies the threshold. In a twenty-seventh aspect, alone or in combination with one or more of the first through twenty-sixth aspects, process 900 further comprises converting the priority associated with the uplink communication to a first 1-bit value and converting the priority associated with the sidelink communication to a second 1-bit value, and transmitting at least one of the uplink communication or the sidelink communication comprises transmitting at least one of the uplink communication or the sidelink communication based at least in part on the first 1-bit value and the second 1-bit value.

In a twenty-eighth aspect, alone or in combination with one or more of the first through twenty-seventh aspects, detecting the collision includes determining that the UE is not capable of simultaneously transmitting of the uplink communication and the transmission of the sidelink communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
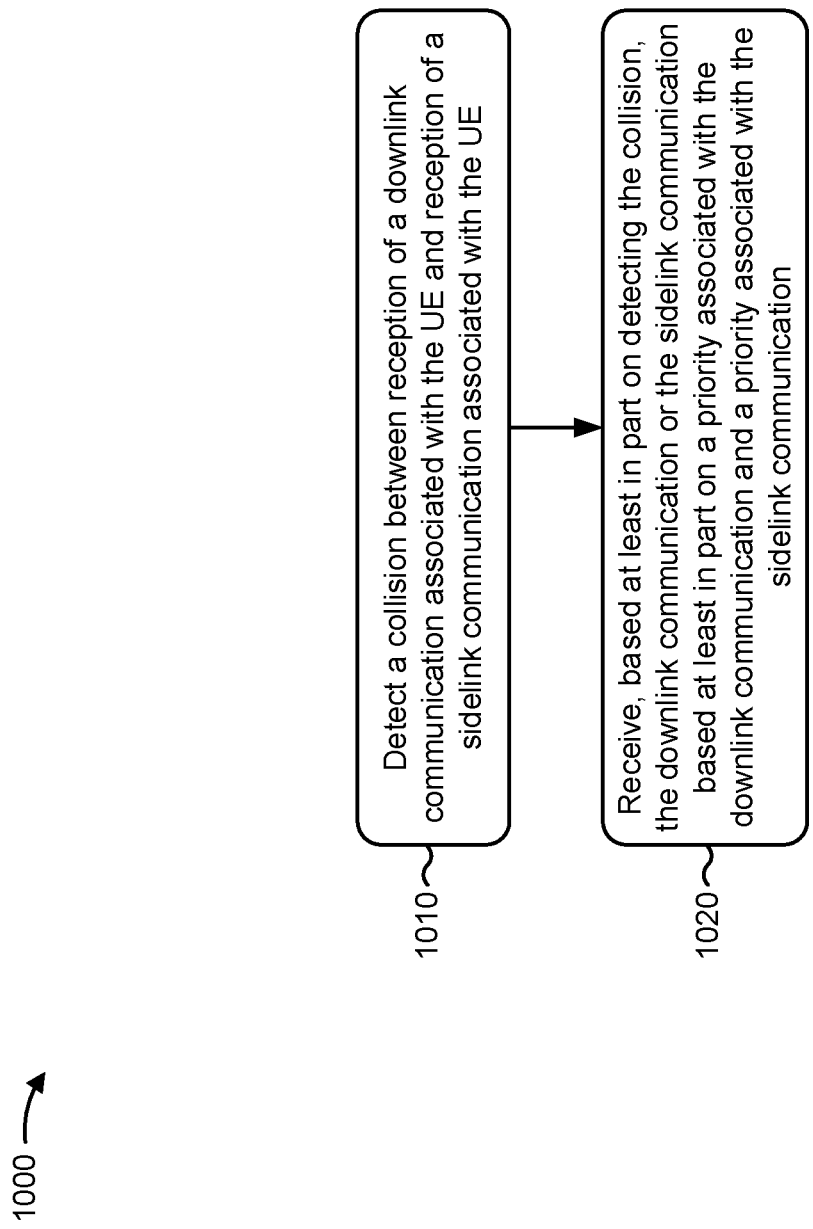

FIG. 10 is a diagram illustrating an example process 1000 performed, for example, by a UE, in accordance with various aspects of the present disclosure. Example process 1000 is an example where a UE (e.g., UE 120) performs operations associated with handling collisions between access link communications and sidelink communications.

As shown in FIG. 10, in some aspects, process 1000 may include detecting a collision between reception of a downlink communication associated with the UE and reception of a sidelink communication associated with the UE (block 1010). For example, the UE (e.g., using receive processor 258, transmit processor 264, controller/processor 280, memory 282, and/or the like) may detect a collision between reception of a downlink communication associated with the UE and reception of a sidelink communication associated with the UE, as described above.

As further shown in FIG. 10, in some aspects, process 1000 may include receiving, based at least in part on detecting the collision, the downlink communication or the sidelink communication based at least in part on a priority associated with the downlink communication and a priority associated with the sidelink communication (block 1020). For example, the UE (e.g., using receive processor 258, transmit processor 264, controller/processor 280, memory 282, and/or the like) may receive, based at least in part on detecting the collision, the downlink communication or the sidelink communication based at least in part on a priority associated with the downlink communication and a priority associated with the sidelink communication, as described above.

Process 1000 may include additional aspects, such as any single aspect or any combination of aspects described below and/or in connection with one or more other processes described elsewhere herein.

In a first aspect, detecting the collision comprises determining that the reception of the downlink communication and the reception of the sidelink communication at least partially overlap in a time domain. In a second aspect, alone or in combination with the first aspect, process 1000 further comprises determining that the priority associated with the sidelink communication is higher relative to the priority associated with the downlink communication, and receiving the downlink communication or the sidelink communication comprises receiving the sidelink communication based at least in part on determining that the priority associated with the sidelink communication is higher relative to the priority associated with the downlink communication.

In a third aspect, alone or in combination with one or more of the first and second aspects, process 1000 further comprises determining that the priority associated with the downlink communication is higher relative to the priority associated with the sidelink communication, and receiving the downlink communication or the sidelink communication comprises receiving the downlink communication based at least in part on determining that the priority associated with the downlink communication is higher relative to the priority associated with the sidelink communication. In a fourth aspect, alone or in combination with one or more of the first through third aspects, process 1000 further comprises determining that the priority associated with the downlink communication and the priority associated with the sidelink communication are a same priority, and receiving the downlink communication or the sidelink communication comprises receiving the sidelink communication based at least in part on determining that the priority associated with the downlink communication and the priority associated with the sidelink communication are the same priority.

In a fifth aspect, alone or in combination with one or more of the first through fourth aspects, process 1000 further comprises determining that the priority associated with the downlink communication and the priority associated with the sidelink communication are a same priority, and receiving the downlink communication or the sidelink communication comprises receiving the downlink communication based at least in part on determining that the priority associated with the downlink communication and the priority associated with the sidelink communication are the same priority. In a sixth aspect, alone or in combination with one or more of the first through fifth aspects, process 1000 further comprises determining that the priority associated with the downlink communication and the priority associated with the sidelink communication are a same priority, and receiving the downlink communication or the sidelink communication comprises receiving, based at least in part on determining that the priority associated with the downlink communication and the priority associated with the sidelink communication are the same priority, the downlink communication or the sidelink communication based at least in part on a physical channel type associated with the downlink communication and a physical channel type associated with the sidelink communication.

In a seventh aspect, alone or in combination with one or more of the first through sixth aspects, receiving the downlink communication or the sidelink communication comprises receiving the downlink communication based at least in part on the physical channel type associated with the downlink communication being a PRACH and the physical channel type associated with the sidelink communication being a PSFCH. In an eighth aspect, alone or in combination with one or more of the first through seventh aspects, receiving the downlink communication or the sidelink communication comprises receiving the sidelink communication based at least in part on the physical channel type associated with the sidelink communication being a PSFCH and the physical channel type associated with the downlink communication being a PDCCH.

In a ninth aspect, alone or in combination with one or more of the first through eighth aspects, receiving the downlink communication or the sidelink communication comprises receiving the downlink communication based at least in part on the physical channel type associated with the downlink communication being a PDCCH and the physical channel type associated with the sidelink communication being a PSSCH. In a tenth aspect, alone or in combination with one or more of the first through ninth aspects, receiving the downlink communication or the sidelink communication comprises receiving the sidelink communication based at least in part on the physical channel type associated with the sidelink communication being a PSSCH and the physical channel type associated with the downlink communication being a PDSCH.

In an eleventh aspect, alone or in combination with one or more of the first through tenth aspects, process 1000 further comprises determining that the priority associated with the downlink communication and the priority associated with the sidelink communication are a same priority, and receiving the downlink communication or the sidelink communication comprises receiving, based at least in part on determining that the priority associated with the downlink communication and the priority associated with the sidelink communication are the same priority, the downlink communication or the sidelink communication based at least in part on a transmission type associated with the sidelink communication. In a twelfth aspect, alone or in combination with one or more of the first through eleventh aspects, receiving the downlink communication or the sidelink communication comprises receiving the sidelink communication based at least in part on the transmission type associated with the sidelink communication being broadcast, groupcast, or multicast.

In a thirteenth aspect, alone or in combination with one or more of the first through twelfth aspects, receiving the downlink communication or the sidelink communication comprises receiving the downlink communication based at least in part on the transmission type associated with the sidelink communication being unicast. In a fourteenth aspect, alone or in combination with one or more of the first through thirteenth aspects, process 1000 further comprises determining that the priority associated with the downlink communication and the priority associated with the sidelink communication are a same priority, and receiving the downlink communication or the sidelink communication comprises receiving, based at least in part on determining that the priority associated with the downlink communication and the priority associated with the sidelink communication are the same priority, the downlink communication or the sidelink communication based at least in part on a time-domain resource in which the reception of the sidelink communication and the reception of the downlink communication at least partially overlap. In a fifteenth aspect, alone or in combination with one or more of the first through fourteenth aspects, receiving the downlink communication or the sidelink communication comprises receiving the sidelink communication based at least in part on the time-domain resource being scheduled for sidelink retransmissions.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
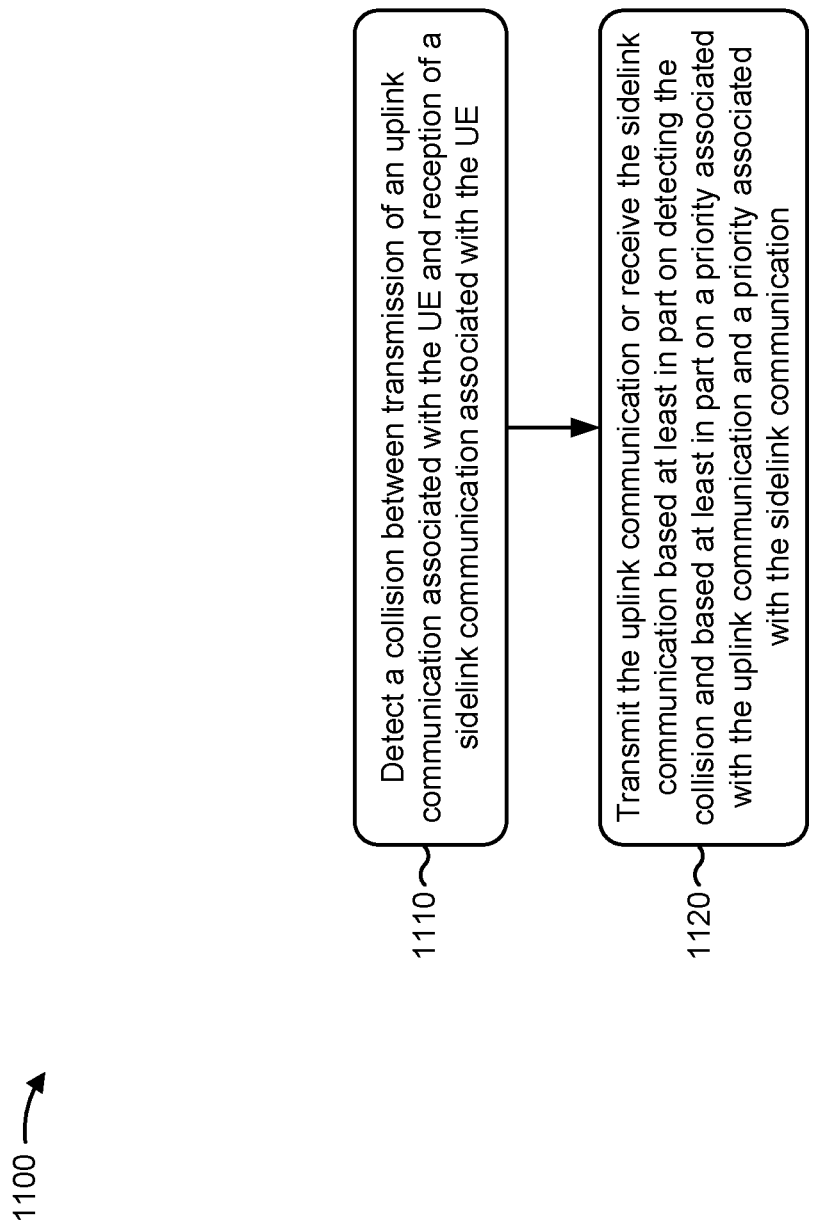

FIG. 11 is a diagram illustrating an example process 1100 performed, for example, by a UE, in accordance with various aspects of the present disclosure. Example process 1100 is an example where a UE (e.g., UE 120) performs operations associated with handling collisions between access link and sidelink.

As shown in FIG. 11, in some aspects, process 1100 may include detecting a collision between transmission of an uplink communication associated with the UE and reception of a sidelink communication associated with the UE (block 1110). For example, the UE (e.g., using receive processor 258, transmit processor 264, controller/processor 280, memory 282, and/or the like) may detect a collision between transmission of an uplink communication associated with the UE and reception of a sidelink communication associated with the UE, as described above.

As further shown in FIG. 11, in some aspects, process 1100 may include transmitting the uplink communication or receiving the sidelink communication based at least in part on detecting the collision and based at least in part on a priority associated with the uplink communication and a priority associated with the sidelink communication (block 1120). For example, the UE (e.g., using receive processor 258, transmit processor 264, controller/processor 280, memory 282, and/or the like) may transmit the uplink communication or receive the sidelink communication based at least in part on detecting the collision and based at least in part on a priority associated with the uplink communication and a priority associated with the sidelink communication, as described above.

Process 1100 may include additional aspects, such as any single aspect or any combination of aspects described below and/or in connection with one or more other processes described elsewhere herein.

In a first aspect, detecting the collision comprises determining that the transmission of the uplink communication and the reception of the sidelink communication at least partially overlap in a time domain. In a second aspect, alone or in combination with the first aspect, process 1100 further comprises determining that the priority associated with the sidelink communication is higher relative to the priority associated with the uplink communication, and transmitting the uplink communication or receiving the sidelink communication comprises receiving the sidelink communication based at least in part on determining that the priority associated with the sidelink communication is higher relative to the priority associated with the uplink communication.

In a third aspect, alone or in combination with one or more of the first and second aspects, process 1100 further comprises determining that the priority associated with the uplink communication is higher relative to the priority associated with the sidelink communication, and transmitting the uplink communication or receiving the sidelink communication comprises transmitting the uplink communication based at least in part on determining that the priority associated with the uplink communication is higher relative to the priority associated with the sidelink communication. In a fourth aspect, alone or in combination with one or more of the first through third aspects, process 1100 further comprises determining that the priority associated with the uplink communication and the priority associated with the sidelink communication are a same priority, and transmitting the uplink communication or receiving the sidelink communication comprises receiving the sidelink communication based at least in part on determining that the priority associated with the uplink communication and the priority associated with the sidelink communication are the same priority.

In a fifth aspect, alone or in combination with one or more of the first through fourth aspects, process 1100 further comprises determining that the priority associated with the uplink communication and the priority associated with the sidelink communication are a same priority, and transmitting the uplink communication or receiving the sidelink communication comprises transmitting the uplink communication based at least in part on determining that the priority associated with the uplink communication and the priority associated with the sidelink communication are the same priority. In a sixth aspect, alone or in combination with one or more of the first through fifth aspects, process 1100 further comprises determining that the priority associated with the uplink communication and the priority associated with the sidelink communication are a same priority, and transmitting the uplink communication or receiving the sidelink communication comprises transmitting the uplink communication or receiving the sidelink communication based at least in part on a physical channel type associated with the uplink communication and a physical channel type associated with the sidelink communication.

In a seventh aspect, alone or in combination with one or more of the first through sixth aspects, transmitting the uplink communication or receiving the sidelink communication comprises transmitting the uplink communication based at least in part on the physical channel type associated with the uplink communication being a PRACH and the physical channel type associated with the sidelink communication being a PSFCH. In an eighth aspect, alone or in combination with one or more of the first through seventh aspects, transmitting the uplink communication or receiving the sidelink communication comprises receiving the sidelink communication based at least in part on the physical channel type associated with the sidelink communication being a PSFCH and the physical channel type associated with the uplink communication being a PUCCH.

In a ninth aspect, alone or in combination with one or more of the first through eighth aspects, transmitting the uplink communication or receiving the sidelink communication comprises transmitting the uplink communication based at least in part on the physical channel type associated with the uplink communication being a PUCCH and the physical channel type associated with the sidelink communication being a PSSCH. In a tenth aspect, alone or in combination with one or more of the first through ninth aspects, transmitting the uplink communication or receiving the sidelink communication comprises receiving the sidelink communication based at least in part on the physical channel type associated with the sidelink communication being a PSSCH and the physical channel type associated with the uplink communication being a PUSCH.

In an eleventh aspect, alone or in combination with one or more of the first through tenth aspects, process 1100 further comprises determining that the priority associated with the uplink communication and the priority associated with the sidelink communication are a same priority, and transmitting the uplink communication or receiving the sidelink communication comprises transmitting the uplink communication or receiving the sidelink communication based at least in part on a transmission type associated with the sidelink communication. In a twelfth aspect, alone or in combination with one or more of the first through eleventh aspects, transmitting the uplink communication or receiving the sidelink communication comprises receiving the sidelink communication based at least in part on the transmission type associated with the sidelink communication being broadcast, groupcast, or multicast. In a thirteenth aspect, alone or in combination with one or more of the first through twelfth aspects, transmitting the uplink communication or receiving the sidelink communication comprises transmitting the uplink communication based at least in part on the transmission type associated with the sidelink communication being unicast.

In a fourteenth aspect, alone or in combination with one or more of the first through thirteenth aspects, process 1100 further comprises determining that the priority associated with the uplink communication and the priority associated with the sidelink communication are a same priority, and transmitting the uplink communication or receiving the sidelink communication comprises transmitting the uplink communication or receiving the sidelink communication based at least in part on a time-domain resource in which the reception of the sidelink communication and the transmission of the uplink communication at least partially overlap. In a fifteenth aspect, alone or in combination with one or more of the first through fourteenth aspects, transmitting the uplink communication or receiving the sidelink communication comprises receiving the sidelink communication based at least in part on the time-domain resource being scheduled for sidelink retransmissions.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
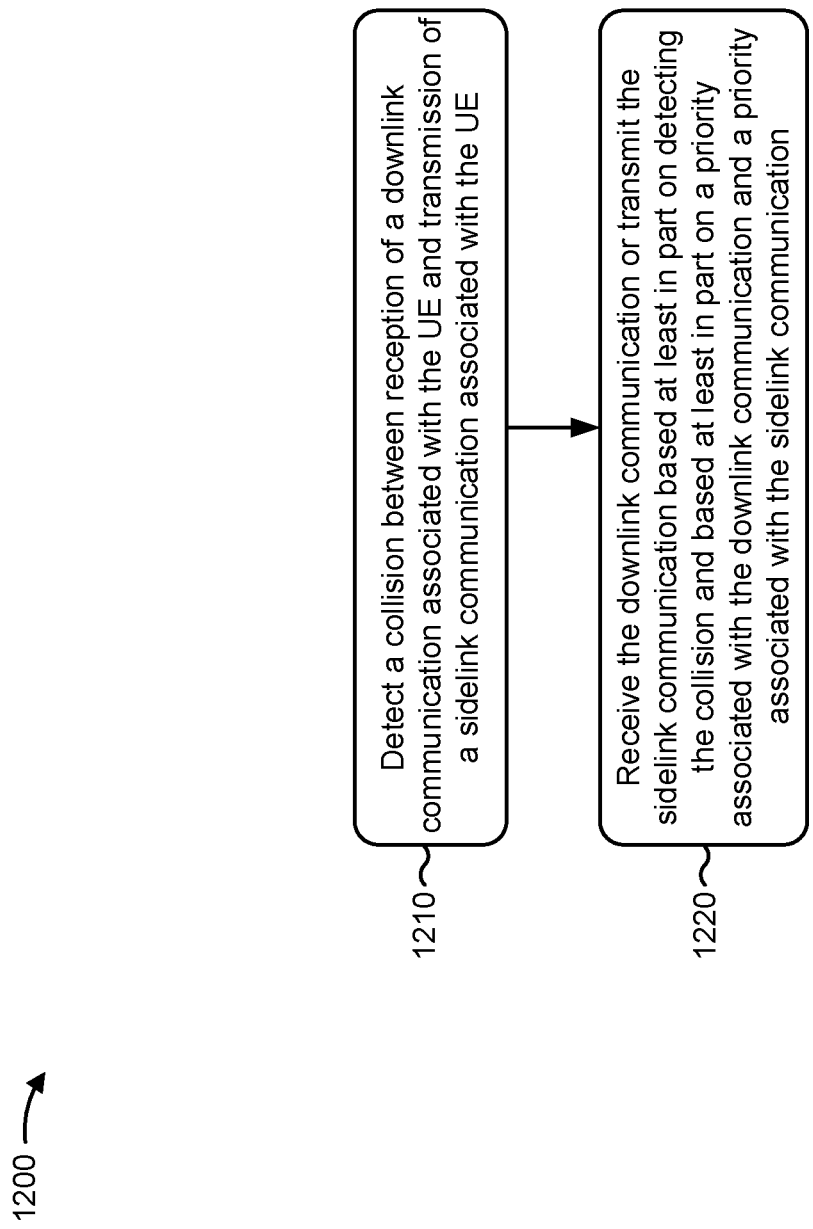

FIG. 12 is a diagram illustrating an example process 1200 performed, for example, by a UE, in accordance with various aspects of the present disclosure. Example process 1200 is an example where a UE (e.g., UE 120) performs operations associated with handling collisions between access link communications and sidelink communications.

As shown in FIG. 12, in some aspects, process 1200 may include detecting a collision between reception of a downlink communication associated with the UE and transmission of a sidelink communication associated with the UE (block 1210). For example, the UE (e.g., using receive processor 258, transmit processor 264, controller/processor 280, memory 282, and/or the like) may detect a collision between reception of a downlink communication associated with the UE and transmission of a sidelink communication associated with the UE, as described above.

As further shown in FIG. 12, in some aspects, process 1200 may include receiving the downlink communication or transmitting the sidelink communication based at least in part on detecting the collision and based at least in part on a priority associated with the downlink communication and a priority associated with the sidelink communication (block 1220). For example, the UE (e.g., using receive processor 258, transmit processor 264, controller/processor 280, memory 282, and/or the like) may receive the downlink communication or transmitting the sidelink communication based at least in part on detecting the collision and based at least in part on a priority associated with the downlink communication and a priority associated with the sidelink communication, as described above.

Process 1200 may include additional aspects, such as any single aspect or any combination of aspects described below and/or in connection with one or more other processes described elsewhere herein.

In a first aspect, detecting the collision comprises determining that the reception of the downlink communication and the transmission of the sidelink communication at least partially overlap in a time domain. In a second aspect, alone or in combination with the first aspect, process 1200 further comprises determining that the priority associated with the sidelink communication is higher relative to the priority associated with the downlink communication, and receiving the downlink communication or transmitting the sidelink communication comprises transmitting the sidelink communication based at least in part on determining that the priority associated with the sidelink communication is higher relative to the priority associated with the downlink communication.

In a third aspect, alone or in combination with one or more of the first and second aspects, process 1200 further comprises determining that the priority associated with the downlink communication is higher relative to the priority associated with the sidelink communication, and receiving the downlink communication or transmitting the sidelink communication comprises receiving the downlink communication based at least in part on determining that the priority associated with the downlink communication is higher relative to the priority associated with the sidelink communication. In a fourth aspect, alone or in combination with one or more of the first through third aspects, process 1200 further comprises determining that the priority associated with the downlink communication and the priority associated with the sidelink communication are a same priority, and receiving the downlink communication or transmitting the sidelink communication comprises transmitting the sidelink communication based at least in part on determining that the priority associated with the downlink communication and the priority associated with the sidelink communication are the same priority.

In a fifth aspect, alone or in combination with one or more of the first through fourth aspects, process 1200 further comprises determining that the priority associated with the downlink communication and the priority associated with the sidelink communication are a same priority, and receiving the downlink communication or transmitting the sidelink communication comprises receiving the downlink communication based at least in part on determining that the priority associated with the downlink communication and the priority associated with the sidelink communication are the same priority. In a sixth aspect, alone or in combination with one or more of the first through fifth aspects, process 1200 further comprises determining that the priority associated with the downlink communication and the priority associated with the sidelink communication are a same priority, and receiving the downlink communication or transmitting the sidelink communication comprises receiving the downlink communication or transmitting the sidelink communication based at least in part on a physical channel type associated with the downlink communication and a physical channel type associated with the sidelink communication.

In a seventh aspect, alone or in combination with one or more of the first through sixth aspects, receiving the downlink communication or transmitting the sidelink communication comprises receiving the downlink communication based at least in part on the physical channel type associated with the downlink communication being a PRACH and the physical channel type associated with the sidelink communication being a PSFCH. In an eighth aspect, alone or in combination with one or more of the first through seventh aspects, receiving the downlink communication or transmitting the sidelink communication comprises transmitting the sidelink communication based at least in part on the physical channel type associated with the sidelink communication being a PSFCH and the physical channel type associated with the downlink communication being a PDCCH.

In a ninth aspect, alone or in combination with one or more of the first through eighth aspects, receiving the downlink communication or transmitting the sidelink communication comprises receiving the downlink communication based at least in part on the physical channel type associated with the downlink communication being a PDCCH and the physical channel type associated with the sidelink communication being a PSSCH. In a tenth aspect, alone or in combination with one or more of the first through ninth aspects, receiving the downlink communication or transmitting the sidelink communication comprises transmitting the sidelink communication based at least in part on the physical channel type associated with the sidelink communication being a PSSCH and the physical channel type associated with the downlink communication being a PDSCH.

In an eleventh aspect, alone or in combination with one or more of the first through tenth aspects, process 1200 further comprises determining that the priority associated with the downlink communication and the priority associated with the sidelink communication are a same priority, and receiving the downlink communication or transmitting the sidelink communication comprises receiving the downlink communication or transmitting the sidelink communication based at least in part on a transmission type associated with the sidelink communication.

In a twelfth aspect, alone or in combination with one or more of the first through eleventh aspects, receiving the downlink communication or transmitting the sidelink communication comprises transmitting the sidelink communication based at least in part on the transmission type associated with the sidelink communication being broadcast, groupcast, or multicast. In a thirteenth aspect, alone or in combination with one or more of the first through twelfth aspects, receiving the downlink communication or transmitting the sidelink communication comprises receiving the downlink communication based at least in part on the transmission type associated with the sidelink communication being unicast.

In a fourteenth aspect, alone or in combination with one or more of the first through thirteenth aspects, process 1200 further comprising determining that the priority associated with the downlink communication and the priority associated with the sidelink communication are a same priority, and receiving the downlink communication or transmitting the sidelink communication comprises receiving the downlink communication or transmitting the sidelink communication based at least in part on a time-domain resource in which the transmission of the sidelink communication and the reception of the downlink communication at least partially overlap. In a fifteenth aspect, alone or in combination with one or more of the first through fourteenth aspects, receiving the downlink communication or transmitting the sidelink communication comprises transmitting the sidelink communication based at least in part on the time-domain resource being scheduled for sidelink retransmissions.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting a collision between transmission of an uplink communication, associated with the UE, and reception of a sidelink communication, associated with the UE;
   comparing a sidelink priority value, associated with the UE, and a sidelink priority threshold, associated with the sidelink communication, based at least in part on:
   detecting the collision, and
   an uplink priority value, associated with the uplink communication, being a 1 value; and
   receiving the sidelink communication based at least in part on the sidelink priority value being lower than the sidelink priority threshold.

2. The method of claim 1, wherein receiving the sidelink communication is further based at least in part on the UE being not capable of simultaneously transmitting the uplink communication and receiving the sidelink communication.

3. The method of claim 1, wherein receiving the sidelink communication is further based at least in part on a priority associated with the sidelink communication being higher relative to a priority associated with the uplink communication.

4. The method of claim 3, wherein the priority associated with the uplink communication is indicated via downlink control information (DCI).

5. The method of claim 1, wherein receiving the sidelink communication is further based at least in part on a transmission type associated with the sidelink communication.

6. The method of claim 5, wherein receiving the sidelink communication is further based at least in part on the transmission type associated with the sidelink communication being broadcast, groupcast, or multicast.

7. The method of claim 1, wherein receiving the sidelink communication is further based at least in part on a time-domain resource in which the transmission of the sidelink communication and the transmission of the uplink communication at least partially overlap.

8. The method of claim 7, wherein the time-domain resource is scheduled for sidelink retransmissions.

9. The method of claim 1, wherein detecting the collision is associated with the transmission of the uplink communication and the reception of the sidelink communication at least partially overlapping in a time domain.

10. The method of claim 1, wherein receiving the sidelink communication is further based at least in part on whether a ProSe per-packet priority (PPPP) associated with the sidelink communication satisfies a threshold.

11. The method of claim 1, wherein the uplink communication is associated with a high priority.

12. The method of claim 1, wherein the uplink communication is associated with a low priority.

13. The method of claim 1, wherein the uplink communication includes hybrid automatic repeat request (HARQ) feedback.

14. The method of claim 1, further comprising:
receiving configuration information associated with the sidelink priority threshold,
wherein comparing the sidelink priority value and the sidelink priority threshold is further based at least in part on the configuration information.

15. The method of claim 14, wherein the configuration information is received at a physical layer of the UE.

16. The method of claim 14, wherein the configuration information is received at a medium access control (MAC) layer.

17. The method of claim 1, wherein receiving the sidelink communication is further based at least in part on whether the transmission of the uplink communication and the reception of the sidelink communication are to occur on a same frequency carrier or a same subcarrier.

18. The method of claim 1, wherein the sidelink communication is associated with a physical sidelink feedback channel (PSFCH).

19. The method of claim 1, wherein receiving the sidelink communication is further based at least in part on a total transmission power for simultaneously transmitting the uplink communication and receiving the sidelink communication exceeding a maximum transmit power associated with the UE.

20. A method of wireless communication performed by a user equipment (UE), comprising:
comparing, based at least in part on a collision between transmission of an uplink communication associated with the UE and a sidelink communication associated with the UE and further based at least in part on an uplink priority value associated with the uplink communication being a 1 value, a sidelink priority value, associated with the sidelink communication, and a sidelink priority threshold, associated with the uplink communication; and
receiving, based on comparing the sidelink priority value and the sidelink priority threshold, the sidelink communication when the sidelink priority value is lower than the sidelink priority threshold.

21. The method of claim 20, wherein the collision is associated with the transmission of the uplink communication and a reception of the sidelink communication at least partially overlapping in a time domain.

22. The method of claim 20, wherein receiving the sidelink communication comprises:
receiving the sidelink communication based at least in part on a priority associated with the sidelink communication being higher relative to a priority associated with the uplink communication.

23. The method of claim 22, wherein the priority associated with the uplink communication is indicated via downlink control information (DCI).

24. The method of claim 20, wherein receiving the sidelink communication is further based at least in part on a transmission type associated with the sidelink communication.

25. The method of claim 24, wherein receiving the sidelink communication comprises:
receiving the sidelink communication based at least in part on the transmission type associated with the sidelink communication being broadcast, groupcast, or multicast.

26. The method of claim 20, wherein receiving the sidelink communication is further based at least in part on a time-domain resource in which reception of the sidelink communication and the transmission of the uplink communication at least partially overlap.

27. The method of claim 26, wherein receiving the sidelink communication comprises:
receiving the sidelink communication based at least in part on the time-domain resource being scheduled for sidelink retransmissions.

28. The method of claim 20, wherein the uplink communication is associated with a high priority.

29. The method of claim 20, wherein the uplink communication is associated with a low priority.

30. The method of claim 20, further comprising:
receiving configuration information associated with the sidelink priority threshold,
wherein comparing the sidelink priority value and the sidelink priority threshold is further is further based at least in part on the configuration information.

31. The method of claim 30, wherein the configuration information is received at a physical layer of the UE.

32. The method of claim 30, wherein the configuration information is received at a medium access control (MAC) layer.

33. The method of claim 20, wherein receiving the sidelink communication is further based at least in part on whether the transmission of the uplink communication and a reception of the sidelink communication are to occur on a same frequency carrier or a same subcarrier.

34. The method of claim 20, wherein the sidelink communication is associated with a physical sidelink feedback channel (PSFCH).

35. The method of claim 20, wherein receiving the sidelink communication is further based at least in part on a total transmission power for simultaneously transmitting the uplink communication and receiving the sidelink communication exceeding a maximum transmit power associated with the UE.

36. The method of claim 20, wherein receiving the sidelink communication is further based at least in part on whether a ProSe per-packet priority (PPPP) associated with the sidelink communication satisfies a threshold.

37. The method of claim 20, wherein the uplink communication includes hybrid automatic repeat request (HARQ) feedback.

38. A user equipment (UE) for wireless communication, comprising:
one or more memories; and
one or more processors, coupled to the one or more memories, configured to:

detect a collision between transmission of an uplink communication, associated with the UE, and reception of a sidelink communication, associated with the UE;
compare a sidelink priority value, associated with the sidelink communication, and a sidelink priority threshold, associated with the sidelink communication, based at least in part on:
detecting the collision, and
an uplink priority value, associated with the uplink communication, being a 1 value; and
receive the sidelink communication based at least in part on the sidelink priority value being lower than sidelink priority threshold.

39. The UE of claim 38, wherein the one or more processors, to receive the sidelink communication, are configured to:
receive the sidelink communication based at least in part on: the UE being not capable of simultaneously transmitting the uplink communication and receiving the sidelink communication.

40. The UE of claim 38, wherein the one or more processors, to receive the sidelink communication, are configured to:
receive the sidelink communication based at least in part on a priority associated with the sidelink communication being higher relative to a priority associated with the uplink communication.

41. The UE of claim 38, wherein the collision is associated with the transmission of the uplink communication and the reception of the sidelink communication at least partially overlapping in a time domain.

42. The UE of claim 38, wherein the uplink communication includes hybrid automatic repeat request (HARQ) feedback.

43. The UE of claim 38, wherein the one or more processors are further configured to:
receive configuration information associated with the sidelink priority threshold,
wherein the one or more processors, to compare the sidelink priority value and the sidelink priority threshold is further, are configured to:
compare the sidelink priority value and the sidelink priority threshold at least in part on:
detecting the collision,
the uplink priority value associated with the uplink communication being a 1 value, and
the configuration information.

44. The UE of claim 43, wherein the configuration information is received at a physical layer of the UE.

45. The UE of claim 43, wherein the configuration information is received at a medium access control (MAC) layer.

46. The UE of claim 38, wherein the sidelink communication is associated with a physical sidelink feedback channel (PSFCH).

47. The UE of claim 38, wherein the uplink communication is associated with a high priority.

48. The UE of claim 38, wherein the uplink communication is associated with a low priority.

49. The UE of claim 38, wherein the one or more processors, to receive the sidelink communication, are configured to:
receive the sidelink communication further based at least in part on a total transmission power for simultaneously transmitting the uplink communication and receiving the sidelink communication exceeding a maximum transmit power associated with the UE.

50. The UE of claim 38, wherein the one or more processors, to receive the sidelink communication, are configured to:
receive the sidelink communication further based at least in part on a transmission type associated with the sidelink communication.

51. The UE of claim 50, wherein the one or more processors, to receive the sidelink communication, are configured to:
receive the sidelink communication further based at least in part on the transmission type associated with the sidelink communication being broadcast, groupcast, or multicast.

52. The UE of claim 38, wherein the one or more processors, to receive the sidelink communication, are configured to:
receive the sidelink communication further based at least in part on a time-domain resource in which the transmission of the sidelink communication and the transmission of the uplink communication at least partially overlap.

53. The UE of claim 38, wherein the one or more processors, to receive the sidelink communication, are configured to:
receive the sidelink communication further based at least in part on whether a ProSe per-packet priority (PPPP) associated with the sidelink communication satisfies a threshold.

54. The UE of claim 38, wherein the one or more processors, to receive the sidelink communication, are configured to:
receive the sidelink communication further based at least in part on whether the transmission of the uplink communication and the reception of the sidelink communication are to occur on a same frequency carrier or a same subcarrier.

55. The UE of claim 38, wherein the one or more processors are further configured to:
drop the uplink communication.

56. The UE of claim 38, wherein a priority associated with the sidelink communication is higher relative to a priority associated with the uplink communication.

57. The UE of claim 56, wherein the one or more processors, to detect the collision, are configured to:
determine that the transmission of the uplink communication and the transmission of the sidelink communication are to occur on different frequency carriers; and
determine that the transmission of the uplink communication and the transmission of the sidelink communication at least partially overlap in a time domain.

58. The UE of claim 57, wherein the one or more processors are further configured to:
transmit the uplink communication at a first transmit power,
wherein the sidelink communication is transmitted at a second transmit power greater relative to the first transmit power based at least in part on the priority associated with the sidelink communication being higher relative to the priority associated with the uplink communication.

59. A user equipment (UE) for wireless communication, comprising:
one or more memories; and
one or more processors, coupled to the one or more memories, configured to:
compare, based at least in part on a collision between transmission of an uplink communication associated with the UE and a sidelink communication associated with the UE and further based at least in part on an uplink priority value associated with the uplink communication being a 1 value, a sidelink priority value, associated with the sidelink communication, and a sidelink priority threshold, associated with the uplink communication; and receive, based on comparing the sidelink priority value and the sidelink priority threshold, the sidelink communication when the sidelink priority value is lower than the sidelink priority threshold.

60. The UE of claim 59, wherein the collision is associated with the transmission of the uplink communication and a reception of the sidelink communication at least partially overlapping in a time domain.

61. The UE of claim 59, wherein the one or more processors, to receive the sidelink communication, are configured to:
receive the sidelink communication based at least in part on a priority associated with the sidelink communication being higher relative to a priority associated with the uplink communication.

62. The UE of claim 59, wherein the uplink communication includes hybrid automatic repeat request (HARQ) feedback.

63. The UE of claim 59, wherein the sidelink communication is associated with a physical sidelink feedback channel (PSFCH).

64. The UE of claim 59, wherein the uplink communication is associated with a high priority.

65. The UE of claim 59, wherein, when the uplink communication is associated with a low priority.

66. The UE of claim 59, wherein the one or more processors are further configured to:
receive configuration information associated with the sidelink priority threshold,
wherein the one or more processors, to compare the sidelink priority value and the sidelink priority threshold is further, are configured to:
compare the sidelink priority value and the sidelink priority threshold at least in part on:
detecting the collision,
the uplink priority value associated with the uplink communication being a 1 value, and
the configuration information.

67. The UE of claim 66, wherein the configuration information is received at a physical layer of the UE.

68. The UE of claim 59, wherein the one or more processors, to receive the sidelink communication, are configured to:
receive the sidelink communication further based at least in part on a total transmission power for simultaneously transmitting the uplink communication and receiving the sidelink communication exceeding a maximum transmit power associated with the UE.

69. The UE of claim 59, wherein the one or more processors, to receive the sidelink communication, are configured to:
receive the sidelink communication further based at least in part on a transmission type associated with the sidelink communication.

70. The UE of claim 69, wherein the one or more processors, to receive the sidelink communication, are configured to:
receive the sidelink communication further based at least in part on the transmission type associated with the sidelink communication being broadcast, groupcast, or multicast.

71. The UE of claim 59, wherein the one or more processors, to receive the sidelink communication, are configured to:
receive the sidelink communication further based at least in part on a time-domain resource in which the transmission of the sidelink communication and the transmission of the uplink communication at least partially overlap.

72. The UE of claim 59, wherein the one or more processors, to receive the sidelink communication, are configured to:
receive the sidelink communication further based at least in part on whether a ProSe per-packet priority (PPPP) associated with the sidelink communication satisfies a threshold.

73. The UE of claim 59, wherein the one or more processors, to receive the sidelink communication, are configured to:
receive the sidelink communication further based at least in part on whether the transmission of the uplink communication and a reception of the sidelink communication are to occur on a same frequency carrier or a same subcarrier.

74. The UE of claim 59, wherein the one or more processors are further configured to:
drop the uplink communication.

75. The UE of claim 59, wherein the one or more processors, to detect the collision, are configured to:
determine that the transmission of the uplink communication and the transmission of the sidelink communication are to occur on different frequency carriers; and
determine that the transmission of the uplink communication and the transmission of the sidelink communication at least partially overlap in a time domain.

76. The UE of claim 75, wherein the one or more processors are further configured to:
determine that the priority associated with the sidelink communication is higher relative to the priority associated with the uplink communication; and
transmit the uplink communication at a first transmit power,
wherein the sidelink communication is transmitted at a second transmit power greater relative to the first transmit power based at least in part on the priority associated with the sidelink communication being higher relative to the priority associated with the uplink communication.

\* \* \* \* \*